United States Patent
White et al.

(10) Patent No.: US 8,435,920 B2
(45) Date of Patent: May 7, 2013

(54) CYCLIC CATALYTIC UPGRADING OF CHEMICAL SPECIES USING METAL OXIDE MATERIALS

(75) Inventors: James H. White, Boulder, CO (US); Erick J. Schutte, Thornton, CO (US); Sara L. Rolfe, Loveland, CO (US)

(73) Assignee: Eltron Research & Development, Inc., Boulder, CO (US)

(*) Notice: Subject to any disclaimer, the term of this patent is extended or adjusted under 35 U.S.C. 154(b) by 0 days.

(21) Appl. No.: 12/901,598

(22) Filed: Oct. 11, 2010

(65) Prior Publication Data
US 2011/0024687 A1 Feb. 3, 2011

Related U.S. Application Data

(62) Division of application No. 11/858,564, filed on Sep. 20, 2007, now Pat. No. 7,824,574.

(60) Provisional application No. 60/846,323, filed on Sep. 21, 2006.

(51) Int. Cl.
| | |
|---|---|
| B01J 23/10 | (2006.01) |
| B01J 23/02 | (2006.01) |
| B01J 23/72 | (2006.01) |
| B01J 23/889 | (2006.01) |
| C07C 4/06 | (2006.01) |
| B01J 38/04 | (2006.01) |

(52) U.S. Cl.
USPC .......... 502/304; 502/20; 502/29; 502/31; 502/33; 502/34; 502/51; 502/52; 502/53; 502/324; 502/331; 502/338; 502/340; 502/523; 252/373; 585/636; 585/664

(58) Field of Classification Search .......... 423/604, 423/605, 608, 635, 245.1, 263, 594.2, 594.6; 502/29–34, 39, 51–53, 304, 324, 337, 338, 502/340, 523, 20; 252/373; 585/636, 664
See application file for complete search history.

(56) References Cited

U.S. PATENT DOCUMENTS

| | | | | |
|---|---|---|---|---|
| 5,712,220 A | * | 1/1998 | Carolan et al. | 502/400 |
| 5,714,091 A | * | 2/1998 | Mazanec et al. | 252/373 |
| 6,143,203 A | * | 11/2000 | Zeng et al. | 252/373 |
| 6,165,431 A | * | 12/2000 | Mackay et al. | 423/219 |
| 6,464,955 B2 | * | 10/2002 | Zeng et al. | 423/648.1 |
| 6,641,626 B2 | * | 11/2003 | Van Calcar et al. | 48/198.2 |

OTHER PUBLICATIONS

Ho-Chieh Yu, Kuan-Zong Fung, La1-xSrxCuO2.5-d as new cathode materials for intermediate temperature solid oxide fuel cells, Materials Research Bulletin 38 (2003), pp. 231-239.*

* cited by examiner

*Primary Examiner* — Stanley Silverman
*Assistant Examiner* — Diana J Liao
(74) *Attorney, Agent, or Firm* — Conley Rose, P.C.

(57) ABSTRACT

Processes are disclosure which comprise alternately contacting an oxygen-carrying catalyst with a reducing substance, or a lower partial pressure of an oxidizing gas, and then with the oxidizing gas or a higher partial pressure of the oxidizing gas, whereby the catalyst is alternately reduced and then regenerated to an oxygenated state. In certain embodiments, the oxygen-carrying catalyst comprises at least one metal oxide-containing material containing a composition having the following formulas: (a) $Ce_xB_yB'_zB''O_\delta$, wherein B=Ba, Sr, Ca, or Zr; B'=Mn, Co, and/or Fe; B''=Cu; $0.01<x<0.99$; $0<y<0.6$; $0<z<0.5$; (b) $Ce_{1-x-y}Ni_xB_yO_{2-*}$, wherein B=Zr, Ba, Ca, La, or K; $0.02<x<0.1$; $0<y<0.1$; and $0.02<*<0.15$; and $1<\delta<2.2$ and (c) coal ash either as a catalyst material itself or as a support for said unary or binary metal oxides.

15 Claims, 15 Drawing Sheets

CYCLIC CATALYTIC UPGRADING OF CHEMICAL SPECIES USING METAL OXIDE MATERIALS

CROSS-REFERENCE TO RELATED APPLICATIONS

This application is a divisional application of U.S. patent application Ser. No. 11/858,564 filed Sep. 20, 2007, which claims the benefit under 35 U.S.C. §119(e) of U.S. Provisional Patent Application No. 60/846,323 filed Sep. 21, 2006, the disclosure of which is hereby incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Small Business Innovation Research (SBIR) Contracts No. DE-FG02-05ER84200 and DE-FG02-04ER83936 awarded by the U.S. Department of Energy, and Contract No. NNC06CA53C awarded by NASA.

BACKGROUND

1. Field of Technology

This invention relates generally to the field of catalysis. More specifically, the invention relates to methods of using metal oxide materials for catalytic upgrading of chemical species.

2. Description of Related Art

The general strategy of cyclic catalytic conversion and chemical looping has been reported previously in the literature. The chemical looping partial oxidation of hydrocarbons is taught by Zeng, et al.[19-21] The use of iron oxides in coal gasification in a chemical looping system has been previously reported for converting carbon monoxide in synthesis gas to $CO_2$ (for subsequent decarbonation).[25,26] Additionally, its use in a thermal looping cycle in the same art was evident: thermal energy deposited into the oxygen carrier upon exposure to fuel could then be released upon air oxidation. A coal gasification system (by GE Global Research) employing transition metal (including iron) oxides[27] has been reported. Alstom Power has also reported a gasification system which utilizes calcium oxide.[28]

The use of metal oxide materials for chemical looping combustion of natural gas and methane has appeared in the literature frequently.[1-16] The use of metal oxide materials for cyclic partial oxidation of gaseous hydrocarbons has appeared much less frequently in the literature. Nevertheless, in one instance NiO supported on $Al_2O_3$ was investigated in the chemical looping reforming of methane.[17] The process reported by Lyon uses a packed bed reactor which is alternately exposed to natural gas and air.[23] The packing is a catalyst comprised of NiO, $Fe_2O_3$, MnO, CuO, CoO, CdO, ZnO or mixtures thereof. Lyon also reports a process for heat transfer by unmixed combustion.[24] The process utilizes a reactor packed with nickel oxide, copper oxide, cobalt oxide, silver oxide, tungsten oxide, manganese oxide, or molybdenum oxide which is exposed to a reducing gas, converting the metal oxides to the corresponding metals. The metals are converted back to the metal oxides upon exposure to an oxidizing gas. Additionally, strontium sulfate or barium sulfate can be employed, which, when contacted with reducing gas, are converted to the corresponding sulfides. In this manner, heat can be transferred to the endothermic process (reduction of oxidizing gas).

The chemical looping reforming of liquid fuels has not been reported extensively. The only such prior art is due to Kunii and Kunugi who report a continuous process for catalytic gasification of heavy hydrocarbon oils,[22] and that assigned to BOC who reported the use of perovskitic metal oxides in the cyclic partial oxidation of liquid fuel.

The use of metal oxide materials in separating oxygen from air is a novel process for providing oxygen for various processes. However, its use has been reported in the literature. Specifically, the use of perovskite metal oxides in the cyclic autothermal recovery (CAR) process utilizes the metal oxides as oxygen storage materials to provide oxygen to a number of processes.[18]

There is continuing interest in oxygen-carrying materials for use in a variety of processes.

SUMMARY OF THE INVENTION

In accordance with certain embodiments of the present invention, a process is provided which comprises: alternately contacting an oxygen-carrying catalyst with a reducing substance, or a lower partial pressure of an oxidizing gas, and then with the oxidizing gas or a higher partial pressure of the oxidizing gas, whereby the catalyst is alternately reduced and then regenerated to an oxygenated state. The oxygen-carrying catalyst comprises at least one metal oxide-containing material selected from the group consisting of: (a) compounds having the formula $Ce_xB_yB'_zB''O_\delta$, wherein B=Ba, Sr, Ca, or Zr; B'=Mn, Co, or Fe; B''=Cu; $0.01<x<0.99$; $0<y<0.6$; $0<z<0.5$; and $1<\delta<2.2$; (b) compounds having the formula $Sr_vLa_wB_xB'_yB''_zO_\delta$, wherein B=Co or Fe; B'=Al or Ga; B''=Cu; $0.01<v<1.4$; $0.1<w<1.6$; $0.1<x<1.9$; $0.1<y<0.9$; $0<z<2.2$; and $3<\delta<5.5$; (c) $Ce_{1-x-y}Ni_xB_yO_{2-*}$, wherein B=Zr, Ba, Ca, La, or K; $0.02<x<0.1$; $0<y<0.1$; and $0.02<*<0.15$; (d) $M_{1-x-y}A_x(B)_yO_z$, wherein M=Co, Fe, or Mn; A=Ce, Zr, or both; B=La or Ca; $0.01<x<0.99$; $0.01<y<0.99$; $2<z<3.5$; and $(x+y)\leq 1$; (e) $AB_{1-x}B'_xO_y$, wherein A=Sr or Ba, B=Ce or Zr, B'=Y or Yb, and $0<x<0.5$, on a support comprising $MO_x$, wherein M=Ce, Mn, or Ni, or on a support comprising x % $MO_x$/y % $A_2WO_4$/(MgO or $SiO_2$), wherein M=Ce, Mn, or Ni, and A=Na or K, $1\leq x\leq 3$, and $3<y<8$; (f) unary metal oxides selected from the group consisting of $Fe_2O_3$, $Fe_3O_4$, $MnO_x$, $CoO_x$, $NiO_x$, wherein $1\leq x\leq 2$, $CaCO_3$, $Ca(OH)_2$; (g) binary metal oxides selected from the group consisting of $FeTiO_3$, $Mn_{1-x}CuO_2$, and $Mn_{1-x}Fe_xO_y$, wherein $0.01<x<0.99$, $1\leq y\leq 1.5$; and (h) coal ash either as a catalyst material itself or as a support for the unary or binary metal oxides. In some embodiments, the reducing substance, when contacted with the oxygen-carrying catalyst, is converted to at least one chemical product.

In certain embodiments, the reducing substance is one or more gas, liquid, or solid substance, or a mixture of any of those. In some embodiments, contacting the catalyst includes alternately exposing a fixed bed containing the catalyst to the reducing substance and to the oxidizing gas, or exposing the fixed bed containing the catalyst to a continuous feed of the oxidizing gas and intermittently feeding the reducing substance. In some embodiments, contacting the catalyst includes circulating the catalyst in a fluidized bed system during the alternate contacting of the oxygen-carrying catalyst with a reducing substance, or a lower partial pressure of an oxidizing gas, and then with the oxidizing gas or a higher partial pressure of the oxidizing gas. In some embodiments, contacting the catalyst includes circulating the catalyst in a fluidized bed system wherein the catalyst is reduced in a reactor and is circulated to a regeneration unit for contacting with the oxidizing gas or higher partial pressure of the oxidizing gas.

In some embodiments, the reducing substance comprises a gaseous hydrocarbon, the chemical product is synthesis gas, and the catalyst is active for catalyzing the partial oxidation of the hydrocarbon, wherein the catalyst comprises (a) $Ce_xB_yB'_zB''_wO_\delta$, wherein B=Ba, Sr, Ca, or Zr; B'=Mn, Co, and/or Fe; B''=Cu; $0.01<x<0.99$, $0<y<0.6$, $0<w<0.5$, and $1<\delta<2.2$, or (b) $Ce_{1-x-y}Ni_xB_yO_{2-*}$, wherein B=Zr, Ba, Ca, La, or K; $0.02<x<0.1$; $0<y<0.1$; and $0.02<*<0.15$, or (c) $Sr_vLa_wB_xB'_yB_z''O_\delta$, wherein B=Co or Fe; B'=Al or Ga; B''=Cu, $0.01<v<1.4$; $0.1<w<0.6$; $0.1<x<1.9$; $0.1<y<0.9$; $0<z<2.2$; and $3<\delta<5.5$; or (d) $M_{1-x-y}A_x(B)_yO_z$, wherein M=Co, Fe, or Mn; A=Ce, Zr, or both; B=La or Ca; $0.01<x<0.99$; $0.01<y<0.99$; $2<z<3.5$; and $x+y<1$. In some embodiments, the catalyst comprises $Ce_{0.95}Ni_{0.05}O_{1.95}$, or $Ce_{0.98}Ni_{0.02}O_{1.98}$, or $Ce_{0.90}Ni_{0.05}Ba_{0.05}O_{1.95}$ In some embodiments, the reducing substance comprises a liquid hydrocarbon fuel, the product comprises synthesis gas, and the catalyst is active for catalyzing the partial oxidation of the liquid hydrocarbon fuel, wherein the catalyst comprises $Sr_vLa_wB_xB'_yB''_2O_\delta$, wherein B=Co or Fe, B'=Al or Ga, B''=Cu, $0.01<v<1.4$, $0.1<w<1.6$, $0.1<x<1.9$, $0.1<y<0.9$, $0<z<2.2$, and $3<\delta<5.5$. In some embodiments, the oxygen-carrying catalyst comprises $Sr_{1.4}La_{0.6}CO_{1.6}Al_{0.4}O_5$, or $Sr_{0.31}La_{1.43}Co_{1.33}Al_{0.24}O_{4.81}$, or $Sr_{0.3}La_{1.27}Co_{1.74}Al_{0.21}O_{5.13}$, or $Sr_{0.02}La_{0.26}Fe_{1.63}Al_{0.02}Cu_{2.08}O_{4.97}$.

In certain embodiments, the reducing substance comprises liquid hydrocarbon fuel and lower partial pressure oxidizing gas in combination, the product comprises synthesis gas, the catalyst is active for catalyzing the partial oxidation of the liquid hydrocarbon fuel, and the process includes (a) co-feeding both the fuel and a lower partial pressure of an oxidizing gas to the catalyst in a reforming reactor, to reduce the catalyst, and produce synthesis gas, and (b) then exposing the reduced catalyst to the higher partial pressure of the oxidizing gas in the absence of the fuel to regenerate the catalyst. In some embodiments, the process also includes separating $H_2$ from the synthesis gas. In some embodiments, the catalyst is contacted by the fuel and oxidizing gas at a temperature less than or equal to 900° C. In some embodiments, the catalyst comprises $Sr_vLa_wB_xB'_yB''_2O_\delta$, wherein B=Co or Fe, B'=Al or Ga, B''=Cu, $0.01<v<1.4$, $0.1<w<1.6$, $0.1<x<1.9$, $0.1<y<0.9$, $0<z<2.2$, and $3<\delta<5.5$. In some embodiments, the catalyst comprises (a) $Sr_{1.4}La_{0.6}Co_{1.6}Al_{0.4}O_5$, or (b) $Sr_{0.31}La_{1.43}Co_{1.33}Al_{0.24}O_{4.81}$, or (C) $Sr_{0.3}La_{1.27}CO_{1.74}Al_{0.21}O_{5.13}$, or (d) $Sr_{0.02}La_{0.26}Fe_{1.63}Al_{0.02}Cu_{2.08}O_{4.97}$.

In certain embodiments, the reducing substance comprises a liquid fuel selected from the group consisting of diesel, gasoline, jet fuel, alcohols, glycerol, and plant oils. In certain embodiments, the reducing substance comprises coal particles, the product comprises synthesis gas, and the catalyst is active for catalyzing the gasification of the coal particles, wherein the catalyst comprises at least one metal oxide-containing material selected from the group consisting of $Fe_2O_3$, $Fe_3O_4$, $MnO_x$, $CoO_x$, $NiO_x$, $FeTiO_3$, $CaCO_3$, CaO, and $Mn_{1-x}Cu_xO_y$ or $Mn_{1-x}Fe_xO_y$, wherein $0.01<x<0.99$ and $1\leq y\leq 1.5$, and coal ash either as a catalyst material itself or as a support for the metal oxide-containing material. In certain embodiments, the reducing substance comprises biomass particles, the product comprises synthesis gas, and the catalyst is active for catalyzing the gasification of the biomass particles, wherein the catalyst comprises at least one metal oxide-containing material selected from the group consisting of $Fe_2O_3$, $Fe_3O_4$, $MnO_x$, $CoO_x$, $NiO_x$, $FeTiO_3$, $CaCO_3$, CaO, and $Mn_{1-x}Cu_xO_y$ or $Mn_{1-x}Fe_xO_y$, wherein $0.01<x<0.99$ and $1\leq y\leq 1.5$, and coal ash either as a catalyst material itself or as a support for the metal oxide-containing material.

In certain embodiments, the reducing substance comprises a hydrocarbon, the product comprises a dehydrogenated hydrocarbon, and the catalyst is active for oxidatively dehydrogenating the hydrocarbon, wherein the catalyst comprises: (a) $Ce_xB_yB'_zB''_wO_\delta$, wherein B=Ba, Sr, Ca, or Zr; B'=Mn, Co, or Fe; B''=Cu; $0.01<x<0.99$, $0<y<0.6$, $0<z>0.5$, $0<w<0.5$, and $1<\delta<2.2$, or (b) $Sr_vLa_wB_xB'_yB''_2O_\delta$, wherein B=Co or Fe, B'=Al or Ga, B''=Cu, $0.01<v<1.4$, $0.1<w<1.6$, $0.1<x<1.9$, $0.1<y<0.9$, $0<z<2.2$, and $3<\delta<5.5$, or (c) $AB_{1-x}B'_xO_y$, wherein A=Sr or Ba, B=Ce or Zr, B'=Y or Yb, and $0<x<0.5$, on a support comprising $MO_x$, wherein M=Ce, Mn, or Ni, or on a support comprising x % $MO_x$/y % $A_2WO_4$/(MgO or $SiO_2$), wherein M=Ce, Mn, or Ni, and A=Na or K, $1\leq x\leq 3$, and $3<y<8$. In some embodiments, the catalyst comprises $Sr_{1.4}La_{0.6}Co_{1.6}Al_{0.40}O_5$, or $Sr_{0.31}La_{1.43}Co_{1.33}Al_{0.24}O_{4.81}$, or $Sr_{0.3}La_{1.27}CO_{1.74}Al_{0.21}O_{5.13}$.

In certain embodiments, the reducing substance comprises a hydrocarbon, the product comprises an oxidatively functionalized hydrocarbon, and the catalyst is active for catalyzing the selective oxidation of the hydrocarbon by which at least one oxygenous function is inserted into the hydrocarbon, wherein the catalyst comprises: (a) $Ce_xB_yB'_zB''_wO_\delta$, wherein B=Ba, Sr, Ca, or Zr; B'=Mn, Co, or Fe; B''=Cu; and $0.01<x<0.99$, $0<y<0.6$, $0<w<0.5$, and $1<\delta<2.2$), or (b) $Sr_vLa_wB_xB'_yB''_2O_\delta$, wherein B=Co or Fe, B'=Al or Ga, B''=Cu, $0.01<v<1.4$, $0.1<w<1.6$, $0.1<x<1.9$, $0.1<y<0.9$, $0<z<2.2$, and $3<\delta<5.5$). In some embodiments, the catalyst comprises $Sr_{1.4}La_{0.6}CO_{1.6}Al_{0.40}O_5$, or $Sr_{0.31}La_{1.43}CO_{1.33}Al_{0.24}O_{4.81}$ or $Sr_{0.3}La_{1.27}Co_{1.74}Al_{0.21}O_{5.13}$.

Also provided in accordance with certain embodiments of the present invention is a process for separating oxygen from air, comprising: (1) cyclically adsorbing and desorbing oxygen on an oxygen-carrying catalyst comprising (a) $Ce_xB_yB'_zB''_wO_\delta$, wherein B=Ba, Sr, Ca, or Zr; B'=Mn, Co, or Fe; B''=Cu; and $0.01<x<0.99$, $0<y<0.6$, $0<w<0.5$, and $1<\delta<2.2$), or (b) $Sr_vLa_wB_xB'_yB''_2O_\delta$ (where B=Co or Fe, B'=Al or Ga, B'=Cu, $0.01<v<1.4$, $0.1<w<1.6$, $0.1<x<1.9$, $0.1<y<0.9$, $0<z<2.2$, and $3<\delta<5.5$, or (c) $Sr_wLa_xAl_y(B)_zO_{2-\alpha}$, wherein B=Co, Fe, Cu or a combination of any of those, $0.01<w<1$, $0.01<x<1$, $0.01<y<1$, $0.01<z<1$, and $0<\alpha<1$.

In some embodiments, of an above-described oxygen separation process, adsorbing comprises exposing the catalyst to pressurized air, and the desorbing comprises exposing the catalyst to a vacuum when the catalyst contains adsorbed oxygen. In some embodiments, the catalyst comprises $Sr_{1.4}La_{0.6}Co_{1.6}Al_{0.40}O_5$ or $Sr_{0.3}La_{1.27}CO_{1.74}Al_{0.21}O_{5.135}$ or $Sr_{0.31}La_{1.43}Co_{1.33}Al_{0.24}O_{4.81}$, or $Sr_{0.02}La_{0.26}Fe_{1.63}Al_{0.02}Cu_{2.08}O_{4.97}$, or $Ce_{0.5}Fe_{0.1}Cu_{0.4}O_{25}$ or $CeCo_{0.5}Cu_{0.5}O_3$, or $Ce_{0.12}Mn_{0.34}Co_{0.54}O_{1.64}$, or $Ce_{0.45}Zr_{0.05}Mn_{0.45}Cu_{0.05}O_{1.7}$. In some embodiments the catalyst is supported on a sintered metal fiber filter.

In accordance with certain embodiments of the invention, the reducing substance in an above-described process comprises a combustible waste material, the product is char and volatiles, and the catalyst comprises a metal oxide that is active for pyrolyzing the waste material.

Also provided in accordance with certain embodiments is a process for the cyclic catalytic partial oxidation of a carbon-containing feedstock which comprises (a) in an oxidation stage, passing air over a catalyst comprising a metal or metal oxide that is capable of capturing oxygen from the air, to produce an oxidized catalyst and producing an effluent comprising oxygen-reduced air; (b) passing the feedstock over the oxidized catalyst in a reduction stage to create a product gas comprising carbon monoxide and hydrogen, wherein the oxidized catalyst becomes reduced or partially reduced creating a metal or metal oxide; and (c) repeating (a) to reoxidize the catalyst. In some embodiments, the catalyst comprises at least one metal oxide selected from the group consisting of: (i) $Ce_xB_yB'_zB''O_\delta$, wherein B=Ba, Sr, Ca, or Zr; B'=Mn, Co, or Fe; B''=Cu; $0.01<x<0.99$; $0<y<0.6$; $0<z<0.5$; $1<\delta 2.2$; (ii) $Ce_{1-x-y}Ni_xB_yO_{2-*}$, wherein B=Zr, Ba, Ca, La, or K;

$0.02<x<0.1$; $0.01<y<0.1$; and $0.02<*<0.15$, and (iii) $Sr_vLa_wB_xB'_yB''_2O_\delta$, wherein B=Co or Fe; B'=Al or Ga; B''=Cu; $0.01<v<1.4$; $0.1<w<1.6$; $0.1<x<1.9$; $0.1<y<0.9$; $0<z<2.2$; and $3<\delta<5.5$. In some embodiments the feedstock comprises glycerol.

Certain other embodiments of the present invention provide a process for the direct generation of hydrogen peroxide which comprises: (a) in an oxidation stage, passing air over a catalyst comprising a metal or metal oxide that is capable of capturing oxygen from the air, to produce an oxidized catalyst and producing an effluent comprising oxygen-depleted air; (b) passing hydrogen over the oxidized catalyst in a reduction stage to create a product gas comprising hydrogen peroxide, wherein the oxidized catalyst becomes reduced or partially reduced; and (c) repeating (a) to reoxidize the catalyst, wherein the catalyst comprises a nanostructured catalyst comprising a carbon- or nitrogen-containing metal complex deposited in the pores of a mesoporous support material, wherein the metal is selected from the group consisting of Pt, Pd, Au, Ag, Co, Ni, Cu or Ru.

In accordance with still another embodiment of the invention a process for cyclic reduction of carbon dioxide is provided which comprises: (a) in an oxidation stage, passing carbon dioxide over a catalyst comprising a metal or metal oxide that is capable of capturing oxygen from the carbon dioxide, to produce an oxidized catalyst and producing an effluent comprising carbon monoxide; (b) in a reduction stage, passing hydrogen over the oxidized catalyst to produce water, whereby the oxidized catalyst becomes reduced or partially reduced; and (c) repeating (a) to reoxidize the catalyst, wherein the catalyst comprises iron. In some embodiments, water and carbon monoxide products are recovered.

BRIEF DESCRIPTION OF THE DRAWINGS

For a detailed description of the preferred embodiments of the invention, reference will now be made to the accompanying drawings in which.

DETAILED DESCRIPTION OF PREFERRED EMBODIMENTS

The metal oxide materials $Ce_xB_yB'_zB''_wO_6$ (where B=Ba, Sr, Ca, or Zr; B'=Mn, Co, or Fe; B''=Cu; and $0.01<x<0.99$, $0<y<0.6$, and $0<w<0.5$); $Sr_vLa_wB_xB'_yB''_2O_\delta$ (where B=Co or Fe, B'=Al or Ga, B''=Cu, $0.01<v<1.4$, $0.1<w<1.6$, $0.1<x<1.9$, $0.1<y<0.9$, $0<z<2.2$, and $3<\delta<5.5$); unary metal oxides $Fe_2O_3$, $Fe_3O_4$, $MnO_x$, $CoO_x$, and $NiO_x$ binary metal oxides $FeTiO_3$, $Mn_{1-x}Cu_xO_y$, and $Mn_{1-x}Fe_xO_y$; and coal ash either as a catalyst material itself or as a support for the above unary or binary metal oxides are employed in a process (FIG. 1) in which an oxygen storing or oxygen carrying catalyst comprised of one of the materials is exposed to a gaseous, liquid or solid chemical substance, effecting oxidation of the substance and reduction of the catalyst material. The catalyst material in the reduced state is then exposed to an oxidizing gas (e.g., air), causing the catalyst to be regenerated into its oxidized state and removing carbonaceous or other material that may have accumulated during exposure to the reducing substance. Recently some of the materials ($Sr_xLa_wB_xB'_yB''_2O_8$) have been shown to be active in Fischer-Tropsch synthesis of hydrocarbons from CO and hydrogen. A common feature of these materials that has been recently identified is their considerable oxygen storage capacity (OSC). This is the weight fraction of oxygen that can be incorporated into the materials and then subsequently removed. The ability of the materials to be reversibly and reproducibly subjected to such oxidation-reduction cycles enables them to be employed both as catalysts and as oxygen carriers and catalysts for various oxidation chemistries. This makes possible their use in a variety of applications, which are exemplified herein.

Figure 1A:
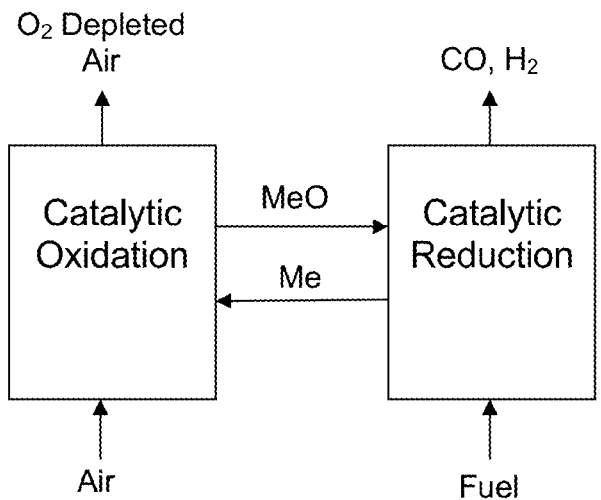
FIG. 1A is a schematic diagram of a process in which an oxygen-carrying material is alternately reduced and then oxidized, in accordance with certain embodiments of the invention.
Figure 1B:
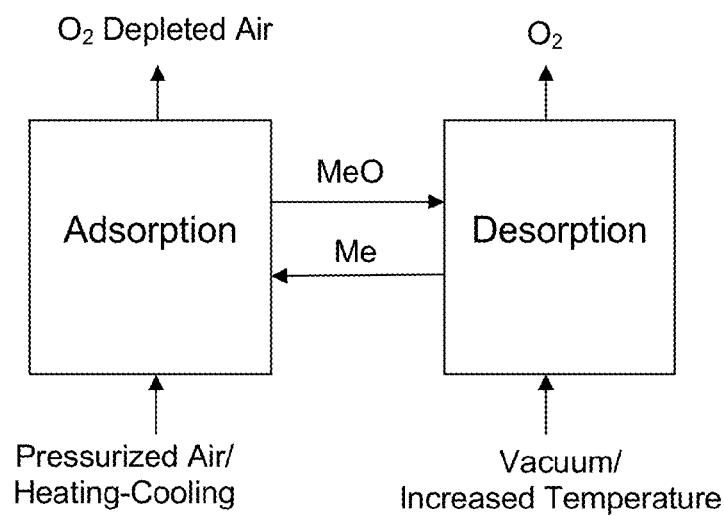
FIG. 1B is a schematic diagram of a process in which an oxygen-carrying material alternately adsorbs and desorbs oxygen when subjected to cyclic applications of pressurized air, with heating-cooling, and then subjected to vacuum and increased temperature to release $O_2$, in accordance with certain embodiments of the invention.
Figure 1C:
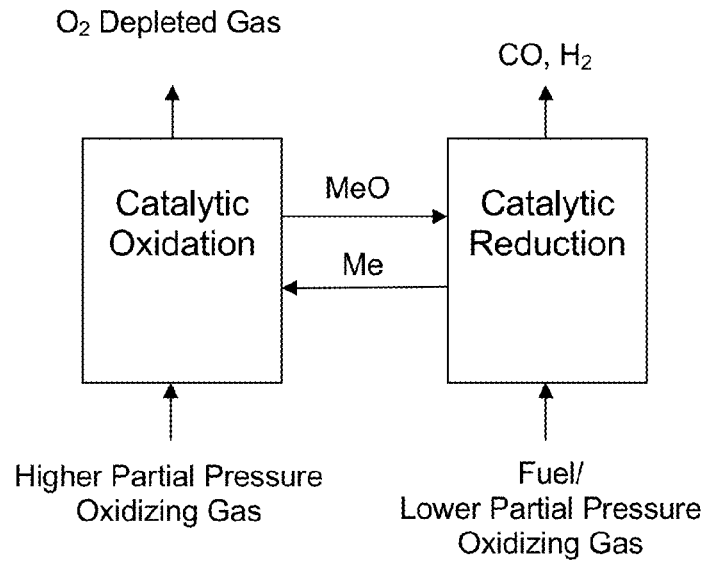
FIG. 1C is a schematic diagram of a process in which an oxygen-carrying material is alternately reduced and then oxidized by exposure to an oxidizing gas at higher partial pressure followed by exposure of the material to the oxidizing gas at a lower partial pressure together with a hydrocarbon feed, in accordance with an embodiment of the invention.

Such applications include, but are not limited to, the following: (1) Partial oxidation of liquid fuels. Organic liquids, including jet fuel, diesel, alcohols, and plant-seed oils can be processed to provide synthesis gas ($CO+H_2$) for various applications including combustion and fuel cells. In a conventional mode, the catalyst is incorporated into pellets or onto a monolith and a mixture of air and atomized or vaporized fuel introduced over the catalyst. In the cyclic (chemical looping or pulsed feed) mode, fine droplets or vapor of the fuel and air is introduced over the catalyst bed along with a carrier gas. The feed to the bed is switched between this mixture and air (or other oxidant), as illustrated in FIG. 1A. Alternatively, air can be fed continuously to the bed and the liquid feed delivered to the reactor (as droplets or vapor) intermittently (as pulsed feed), as illustrated in FIG. 1C. Finally, the liquid feed may be continuously or semi-continuously fed into a reactor containing the catalyst, which continuously circulates between this reactor and a regenerator in which the oxygen carrier is re-oxidized and carbonaceous films and impurities are burned off. This is similar to a fluid catalytic cracking (FCC) reactor. (2) Partial oxidation of gaseous fuels (FIG. 1A). In this case, the feed to the reactor is switched between air and a gaseous fuel (natural gas, methane, or other hydrocarbons). Alternatively, as in (1), the fuel may be fed to a reactor in which catalyst is continuously circulated between a fuel partial oxidation reactor and a regenerator. (3) Gasification of solid fuels. Coal, biomass, industrial waste (petroleum reside, plastics, tire rubber, etc.) is continuously or semi-continuously fed to a reactor containing a fluidized or moving bed of the oxygen carrying catalyst (FIG. 1A). The catalyst circulates between the coal gasification bed and a regeneration bed where the catalyst is exposed to air and reoxidized. Adsorbed impurities liberated from coal can also be released and removed from the regenerator exhaust by scrubbing or other capture processes. (4) Oxygen separation from air. As illustrated in FIG. 1B, a reduced carrier is exposed alternately to air at some temperature and pressure and then to vacuum, lower pressure, a higher temperature, or a combination or lower pressure and higher temperature which causes adsorption equilibrium to shift towards the gas phase. (5) Oxidative dehydrogenation of hydrocarbons. A hydrocarbon (e.g., alkane or olefin) is passed over an oxygen carrying catalyst which is active for the oxidative dehydrogenation of the hydrocarbon. The process may be carried out in either circulating fluidized bed or fixed bed, in pulsed co-feed modes. (6) Selective oxidation of hydrocarbons and other organics. This consists of the functionalization of hydrocarbons by the catalytic insertion of oxygenous functions on carbon atoms or in the oxidation of other groups, e.g., of alcohols to aldehydes. Circulating fluid beds and fixed beds utilizing pulsed co-feed are applicable reactor types, similar to FIGS. 1A and 1C. (7) Cyclic catalytic oxidation/reduction process for gasification of waste, e.g., waste feed, char, volatiles.

Oxygen carrying catalysts utilized in the processes described herein are preferably prepared by co-precipitation, urea precipitation, or sol-gel synthesis, using known techniques. The metal oxide catalysts may take the form of granules, pellets, or monolithic structures. Coal ash may also be used as a support for selected unary ($Fe_2O_3$, $Fe_3O_4$, $MnO_x$, $CoO_x$, and $NiO_x$) and binary ($FeTiO_3$, $Mn_{1-x}Cu_xO_y$, and $Mn_{1-x}Fe_xO_y$) metal oxides. The metal oxide materials and coal ash may be bound with an inorganic binder such as silica, titania, magnesia, boehmite, or zirconia. As indicated above, fixed beds of these catalysts may be either exposed to alternating air and feed or to a continuous feed of air and intermittent (pulsed) feed of feedstock. In various embodiments, fluidized bed systems comprise one, two, or even more fluidized beds, as desired for a particular application. Alternating exposure to air and feed is achieved either by means of a set of valves (for a single bed) or in the case of two or more beds by circulation of the oxygen carrier between the reactor and regenerator beds.

Embodiments of the compositions and methods disclosed herein (1) make possible the production of unique products (2) offer new modes of operation, and (3) employ new oxygen carrying materials. Certain embodiments employ selected oxygen-carrying materials for the selective conversion of hydrocarbons and other fuels to synthesis gas and other more valuable species. Some of the specific materials identified for liquid fuels reforming have not been previously employed. Likewise, use of the metal oxide materials $Sr_{1.4}La_{0.6}CO_{1.6}Al_{0.40}O_5 Sr_{0.3}La_{1.27}Co_{1.74}Al_{0.21}O_{5.13}$, $Sr_{0.31}La_{1.43}CO_{1.33}Al_{0.24}O_{4.81}$, and $Sr_{0.02}La_{0.26}Fe_{1.63}Al_{0.02}Cu_{2.08}O_{4.97}$ as well as of $Ce_{0.5}Fe_{0.1}Cu_{0.4}O_2$, $CeCo_{0.5}Cu_{0.5}O_3$, $Ce_{0.12}Mn_{0.34}Co_{0.54}O_{1.64}$, and $Ce_{0.45}Zr_{0.05}Mn_{0.45}Cu_{0.05}O_{1.7}$ for air separation has not been previously described.

Several applications described herein are distinctive in the mode of operation employed. For example, (1) coal gasification by an indicated method utilizes direct contact of coal with an air oxidized metal oxide material, producing synthesis gas; (2) natural gas chemical looping partial oxidation uses a fixed bed of oxygen-carrying catalyst which is alternately exposed to air and natural gas; (3) chemical looping liquid fuels reforming utilizes a fixed catalyst bed with continuous air feed and intermittent, pulsed delivery of liquid fuel. Representative examples are provided below to further elucidate the preferred embodiments.

Example 1

Cyclic Catalytic (Chemical Looping) Partial Oxidation of Methane

Figure 2:
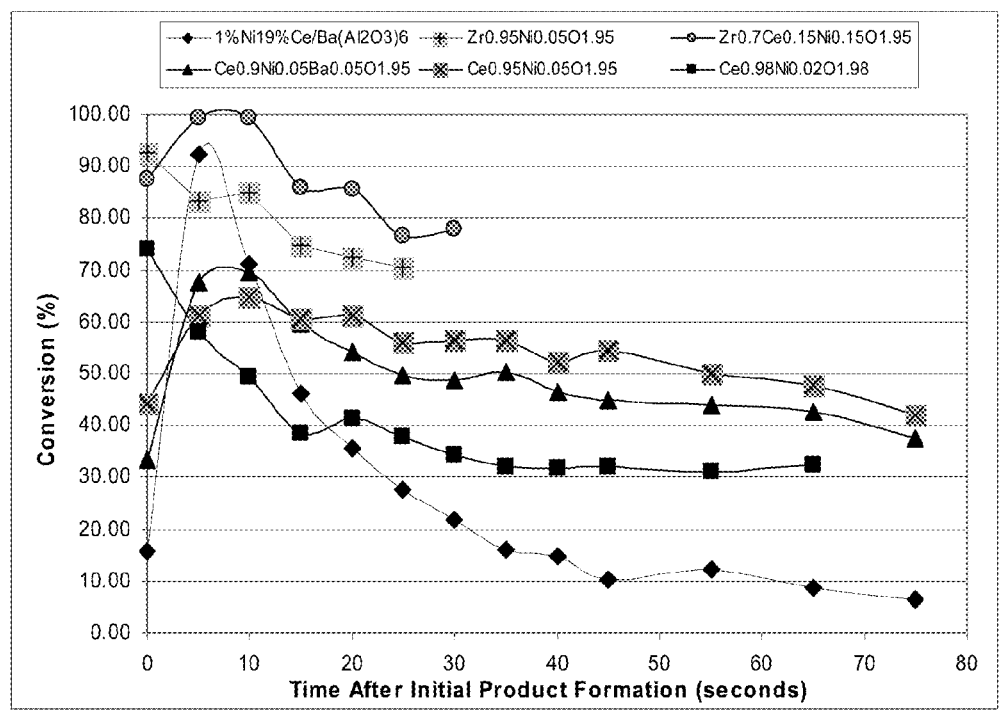
FIG. 2 illustrates methane conversion of selected catalysts over time after initial product formation, in accordance with certain embodiments of the invention.
Figure 3:
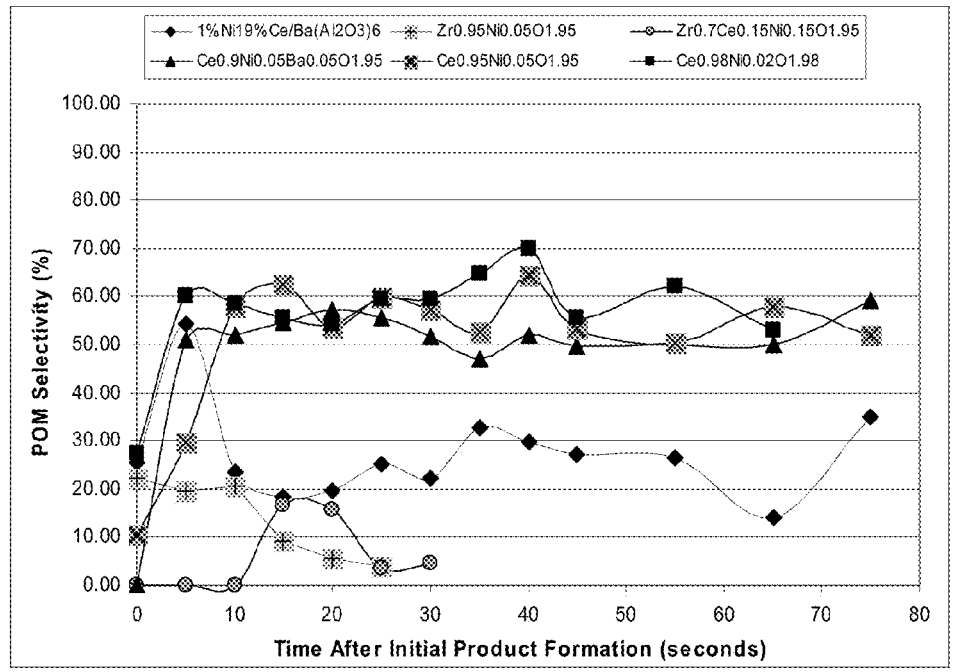
FIG. 3 illustrates selectivity towards POM over time after initial product formation of selected catalysts, in accordance with certain embodiments of the invention.

The catalysts used in these examples were prepared by coprecipitation. A fixed bed of fine catalyst granules (0.5 g) was employed. The catalyst was heated to 750° C. and was exposed to air to oxidize the catalyst. The reactor was then purged with helium and pure methane introduced. Space velocity was 6000 ml/g·min. Measurement of $H_2$, CO, $CO_2$, and $CH_4$ was performed by injection of product stream samples into a gas chromatograph. Samples were taken at some time after the initial observation of products. The catalyst was then reoxidized before another product stream sample was taken at a different time interval after appearance of products. Data for a number of catalysts are summarized in FIGS. 2 and 3 (in both of the figures the shown reactor operates at 750° C., catalyst mass is 0.5 g, and methane flow rate is 50 ml/min) which show methane conversion and selectivity to partial oxidation products versus the time elapsed after introduction of methane, respectively.

Example 2

Chemical Looping Coal Gasification

Figure 4:
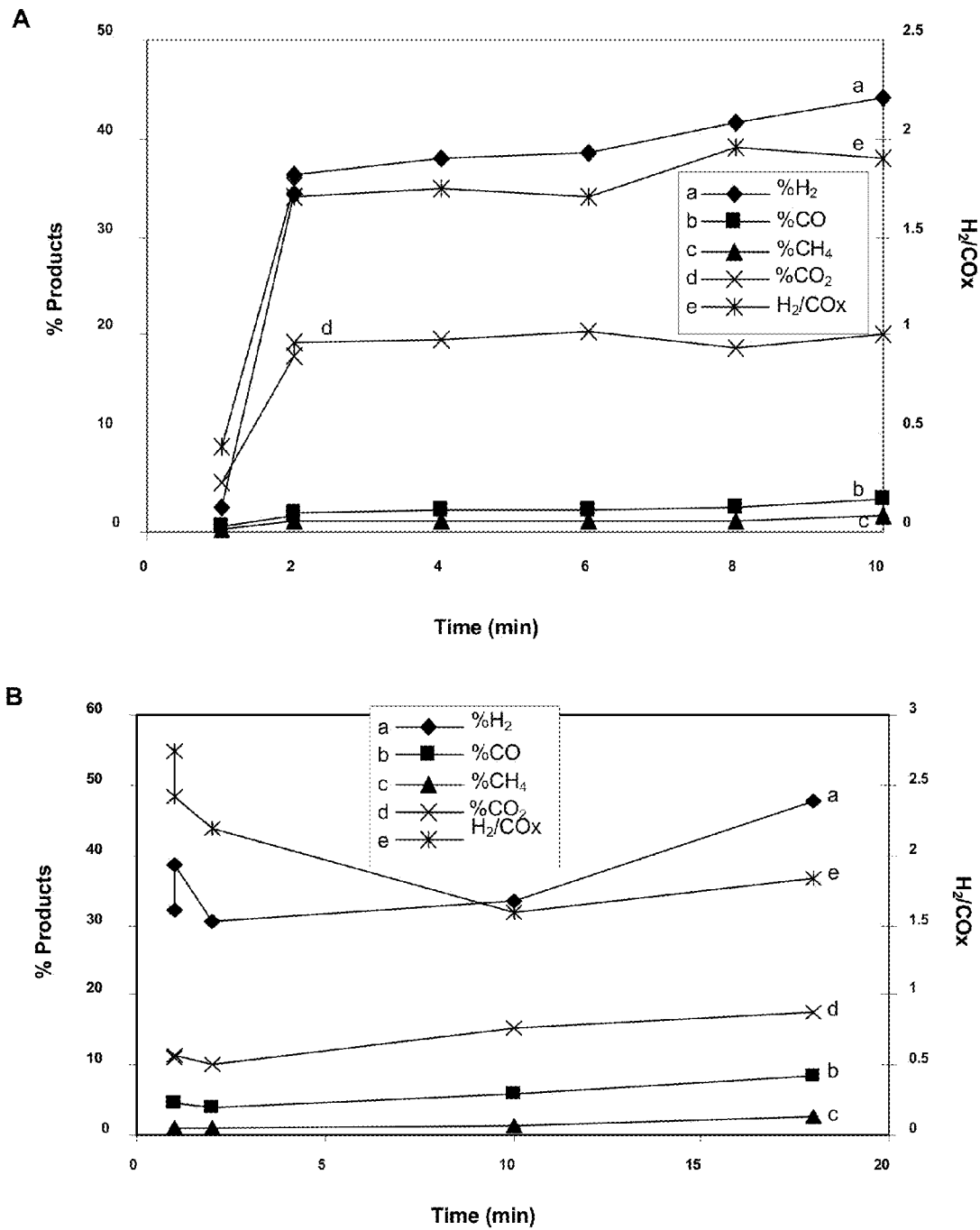
FIG. 4 illustrates plots of product levels generated versus time in the chemical looping gasification of Wyodak coal over 6.9 g (10 ml) 100-170 mesh catalyst, in accordance with certain embodiments of the invention.

A bed of granular catalyst material of mesh size 40-100 mesh heated to between 650° C. and 850° C. was fluidized using atmospheric pressure air, being exposed to air for 5-20 minutes. Fluidization with air was interrupted and steam introduced into the gasifier. Wyodak coal of mesh size 20-40 was then introduced at a rate of 0.33 g/min for 1.75-2.75 minutes. The coal feed was interrupted and allowed to contact the fluidized catalyst for 10-20 minutes. Products were sampled with a gas tight syringe and analyzed using gas chromatography. The resulting product analysis versus contact time between coal and catalyst for an $Fe_3O_4$ catalyst is shown in FIG. 4, where the catalyst is fluidized with steam at a feed rate of 4.6 L/min) at: A) 795° C. Coal feed rate=0.33 g/min. Coal feed interval=first 2.75 min of run. B) 825° C. Coal feed rate=3.3 g/min. Coal feed interval=first 1.75 min of run.

Figure 5:
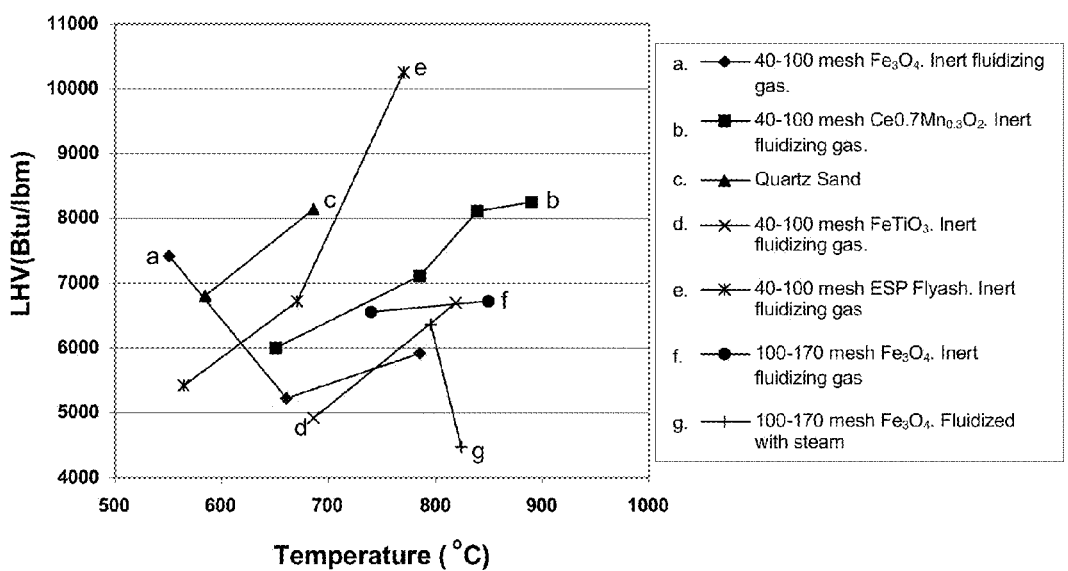
FIG. 5 illustrates lower heating values for undiluted product gases obtained from gasification experiments using certain catalyst embodiments of the invention.

The lower heating value of the gas product versus temperature obtained using several different catalysts in such experiments (absent steam and using nitrogen gas for fluidization) is plotted in FIG. 5 (the heat content of coal (as received)=8593 Btu/1 bm).

Example 3

Cyclic Catalytic Partial Oxidation of Liquid Fuels

A bed of grains of catalyst material was oxidized in air at a temperature between 600° C. and 750° C. for 5-20 minutes. Liquid fuel was then introduced into the reactor at a flow rate of 0.05 ml/min. The gas flow emerging from the reactor was measured using a bubble flow meter. Gaseous products (CO, $CO_2$, $H_2$, and $CH_4$) were analyzed using gas chromatography. Experimental conditions employed and data obtained over preferred catalyst materials $Sr_{0.31}La_{1.43}CO_{1.33}Al_{0.24}O_{4.81}$ (1) and $Sr_{0.3}La_{1.27}Co_{1.74}Al_{0.21}O_{5.13}$ (2) is presented in Tables 1 and 2.

TABLE 1

Summary of Experimental Conditions Employed with Preferred Catalyst Materials

| Cat. | Exp. | Catalyst Wt (g) | Bed Volume (cm³) | Feed Gas | Inlet Flow (ml/min) | GHSV (h⁻¹) | LHSV (h⁻¹) | T (° C.) |
|---|---|---|---|---|---|---|---|---|
| 1 | PI-1 | 0.5 | 0.459 | He | 26 | 2388 | 6.5 | 700 |
|   | PI-2 | 0.448 | 0.486 | Air | 125 | 10845 | 6.2 | 600 |
|   | PI-3 | 0.5 | 0.459 | Air | 159 | 14607 | 6.5 | 700, 800 |
| 2 | PI-4 | 0.5 | 0.338 | He | 26 | 3244 | 8.9 | 700 |
|   | PI-5 | 0.5 | 0.493 | Air | 159 | 13600 | 6.1 | 800 |

TABLE 2

Summary of Product Data for Preferred Catalysts

| Cat. | Exp. | % $H_2$ | % CO | % $CH_4$ | % $CO_2$ | $H_2$/CO | POX Select. | Cracking Select. | $CH_4$ Select. | DOX Select. | $H_2$ mL/min | CO mL/min | $CH_4$ mL/min | $CO_2$ mL/min | Tot. Prod. mL/min |
|---|---|---|---|---|---|---|---|---|---|---|---|---|---|---|---|
| 1 | PI-1 | 37.7 | 16.4 | 2.2 | 7.9 | 2.4 | 31.4 | 49.1 | 4.2 | 15.2 | 34.1 | 15.0 | 1.9 | 7.4 | 58.4 |
|   | PI-2 | 22.8 | 10.8 | 1.0 | 12.3 | 2.2 | 28.3 | 36.9 | 2.7 | 32.2 | 44.0 | 21.1 | 2.0 | 23.4 | 90.6 |
|   | PI-3 | 13.0 | 12.5 | 2.8 | 11.4 | 1.0 | 38.4 | 18.3 | 8.4 | 34.9 | 25.0 | 23.8 | 5.2 | 21.3 | 75.3 |
| 2 | PI-4 | 60.4 | 9.1 | 5.0 | 0.6 | 7.0 | 12.0 | 80.7 | 6.5 | 0.8 | 80.7 | 12.1 | 6.6 | 0.8 | 100.1 |
|   | PI-5 | 26.7 | 25.1 | 0.9 | 2.3 | 1.1 | 79.7 | 10.4 | 2.7 | 7.2 | 64.1 | 60.3 | 2.1 | 5.5 | 132.0 |

Example 4

Separation of Oxygen from Air by Adsorption-Desorption Cycles

Figure 6:
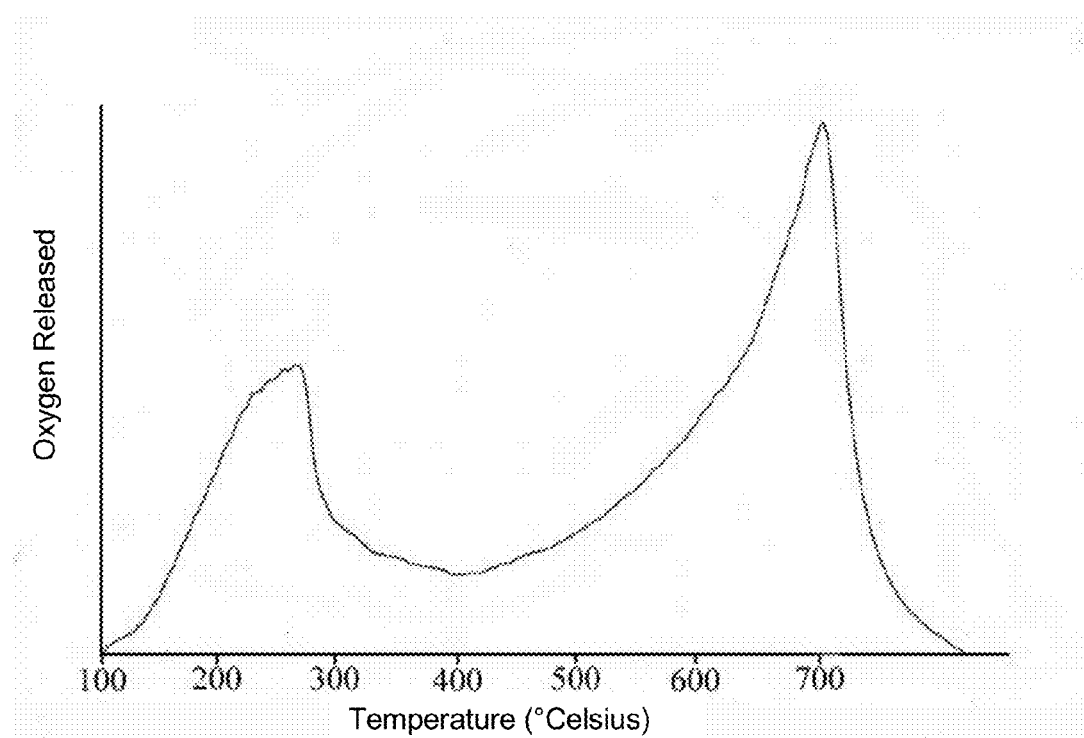
FIG. 6 illustrates a plot of electrochemical sensor response versus adsorbent temperature using certain catalyst embodiments of the invention.

A bed (0.25-0.45 g) of adsorbent material in granular (40-100 mesh) form was heated (at 10° C./min) from 100° C. to 700° C. in air (gas hourly space velocity=6000 h$^{-1}$) and held at 700° C. for 1 hour. The temperature was then decreased from 700° C. to 100° C. at 10° C./min under air and was held at 100° C. for 30 minutes before changing the purge gas to helium. The reactor was then purged for 30 minutes at a temperature of 100° C. The adsorbent bed temperature was then increased at 10° C./min under helium and the effluent from the reactor monitored with an electrochemical oxygen sensor. The sensor output was recorded, giving rise to graphs of the type shown in FIG. 6. Data obtained over key materials is presented in Table 3.

TABLE 3

Summary of Oxygen Desorption Data for Materials of the Invention

| Exp # | Cat. Comp. | Cat. Mass, g | GHSV, hr$^{-1}$ | Cycle # | Total Peak Area |
|---|---|---|---|---|---|
| 1 | $Fe_3O_4$ | 0.2602 | 6000 | 1 | 112,590 |
| 1 | $Fe_3O_4$ | 0.2602 | 6000 | 2 | 94,071 |
| 1 | $Fe_3O_4$ | 0.2602 | 6000 | 3 | 78,209 |
| 2 | $Sr_{1.4}La_{0.6}Co_{1.6}Al_{0.4}O_3$ | 0.2582 | 4000 | 1 | 537,652 |
| 2 | $Sr_{1.4}La_{0.6}Co_{1.6}Al_{0.4}O_3$ | 0.2582 | 4000 | 2 | 430,257 |
| 3 | $Ce_{0.5}Fe_{0.5}O_n$ | 0.3703 | 6000 | 1 | 16,673 |
| 4 | $Sr_{1.4}La_{0.6}Co_{1.6}Al_{0.4}O_3$ | 0.2488 | 6000 | 1 | 297,670 |
| 4 | $Sr_{1.4}La_{0.6}Co_{1.6}Al_{0.4}O_3$ | 0.2488 | 6000 | 2 | 245,425 |
| 5 | $Ce_{0.5}Fe_{0.1}Cu_{0.4}O_2$ | 0.2939 | 6000 | 1 | 265,759 |
| 5 | $Ce_{0.5}Fe_{0.1}Cu_{0.4}O_2$ | 0.2939 | 6000 | 2 | 185,749 |
| 6 | $CeCo_{0.5}Cu_{0.5}O_3$ | 0.3469 | 6000 | 1 | 305,829 |
| 6 | $CeCo_{0.5}Cu_{0.5}O_3$ | 0.3469 | 6000 | 2 | 218,455 |
| 7 | $Ce_{0.12}Mn_{0.34}Co_{0.54}O_{1.64}$ | 0.2552 | 6000 | 1 | 744,629 |
| 7 | $Ce_{0.12}Mn_{0.34}Co_{0.54}O_{1.64}$ | 0.2552 | 6000 | 2 | 592,802 |
| 7 | $Ce_{0.12}Mn_{0.34}Co_{0.54}O_{1.64}$ | 0.2552 | 6000 | 3 | 586,605 |
| 10 | $Sr_{0.02}La_{0.26}Fe_{1.63}Al_{0.02}Cu_{2.08}O_{4.97}$ | 0.2498 | 6000 | 1 | 672,585 |
| 10 | $Sr_{0.02}La_{0.26}Fe_{1.63}Al_{0.02}Cu_{2.08}O_{4.97}$ | 0.2498 | 6000 | 2 | 667,273 |
| 11 | $Ce_{0.45}Zr_{0.05}Mn_{0.45}Cu_{0.05}O_{1.7}$ | 0.2207 | 6000 | 1 | 991,508 |

Example 5

Auto-Thermal Reforming Catalysts for Use in Chemical Looping Systems

Figure 7:
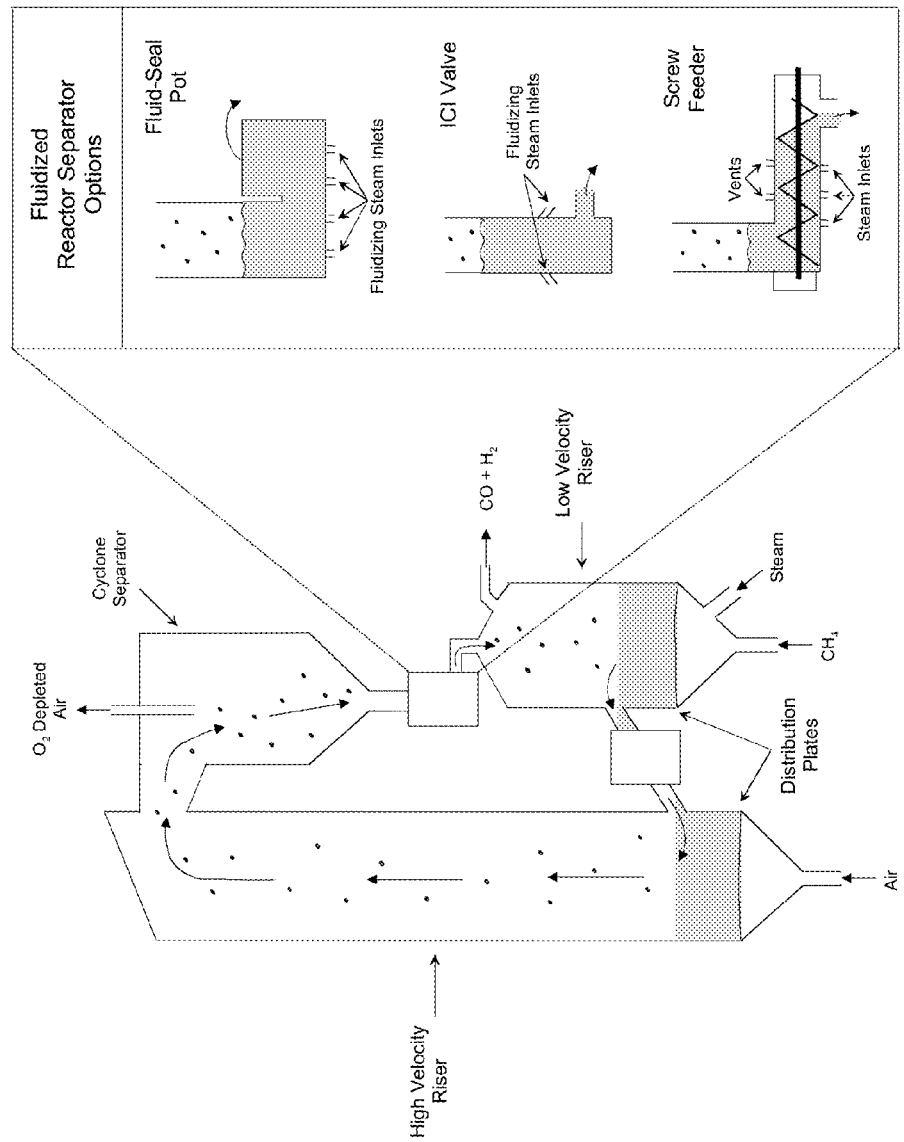
FIG. 7 illustrates a schematic flow diagram of a fluidized bed system for chemical looping using certain catalysts, in accordance with embodiments of the invention.

A fluidized bed cyclic redox (chemical looping) system utilizing a metal oxide oxygen carrier for partial oxidation of methane for the production of syngas/hydrogen is shown in FIG. 7. The reformer consists of a high velocity air fluidized riser connected, through loop seals, to a low velocity methane fluidized riser. Carbon deposition and steam requirements and, possibly, the need for a prereformer are reduced or eliminated by this cyclic mode. This cyclic operation also eliminates the need for an expensive air separation unit or for $H_2/N_2$ separation.

Compositions possessing the general formula $Ce_{1-x-y}Ni_{x-}B_yO_{2-z}$, where B=Zr, Ba, Ca, La, or K; 0.02<x<0.1; and 0.02<y<0.1 which can stand alone or can be deposited on a high surface area support such as alumina, magnesium oxide, ceria, magnesium aluminate, aluminosilicates, or mesoporous silica materials.

Unsupported metal oxide catalysts are prepared by: (i) co-precipitation, (ii) urea precipitation, and (iii) sol gel synthesis, using known techniques. Initially, a number of the compositional parameters x, y, and z are utilized, but following coarse screening, these stoichiometric subscripts are varied based on the experimental results according to mixture and/or Simplex designs.

Supported metal oxide catalysts are prepared through wetness impregnation utilizing compositions of preferred unsupported catalysts on various supports. Synthesis includes suspending 10 grams of support ($Al_2O_3$, MgO, $CeO_2$, or $MgAl_2O_4$) in an aqueous solution of the desired metals (Ce) nitrate and (Ni) nitrate without any supernatant liquid. The slurry is dried by evaporation and then heated in an oven at 120° C. for 8 hours. Following drying, the solid is calcined at 600° C. for 12-24 hours in order to decompose the nitrate and provide a supported metal oxide product.

It has been shown (see Example 1 and FIGS. 2 and 3) that selected catalysts have potential for the chemical looping partial oxidation of methane with $CH_4$ conversion, syngas selectivity and productivity comparable or superior to that of methane steam reforming, but at lower temperature (750° C.) and in an exothermic regime of operation.

Example 6

Fixed Bed Chemical Looping Partial Oxidation Catalysts on SMFF Supports

A metal oxide oxygen carrying catalyst supported on a sintered metal fiber filter (SMFF) is utilized in a fixed bed cyclic redox (chemical looping) system for partial oxidation of methane for the production of syngas/hydrogen. The reformer consists of one or more heated beds of SMFF supported, sulfur tolerant partial oxidation catalyst and operates by alternate exposure to air and gas. Carbon deposition and steam requirements and, possibly, the need for a prereformer are reduced or eliminated by this cyclic mode. This cyclic operation also eliminates the need for an expensive air separation unit or for $H_2/N_2$ separation.

Sintered metal fiber filters (SMFF), consisting of thin metal filaments (d=2-30 μm), were used as the catalyst supports and offer many advantages over ceramic and unsupported material, including: (a) SMFFs are more mechanically and chemically stable than random beds and ceramic monoliths; (b) SMFF's possess a uniform highly porous (70-90% porosity) 3D macrostructure which helps provide a low pressure drop during gas passage; (c) metal fibers have a high thermal conductivity, especially when compared to ceramics, which provides a radial heat transfer coefficient within the reactor bed the result of which is nearly isothermal conditions within the beds; (d) channeling is also avoided because the microfiber matrix acts as a micron scale static mixer; (e) thin coatings, for helping to increase surface area and reduce agglomeration of the impregnated material, are also possible because of the small fiber diameter; (f) the small diameters minimize the coefficient of thermal expansion of the metal fiber thereby eliminating cracking of the oxide layer; and (g) the thin oxide layers also lead to improved mass transfer resistance since the pores of the oxide layer are short and the reactant diffusion does not limit the reaction.

Figure 8:
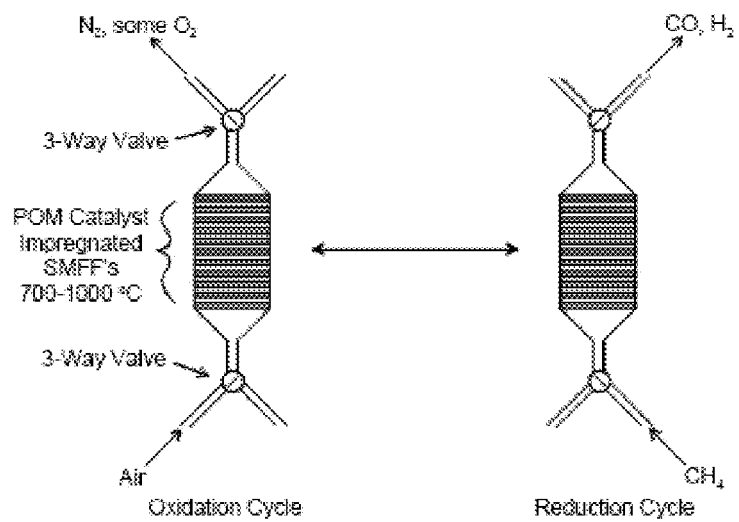
FIG. 8 illustrates a schematic of a fixed bed reactor unit used for a partial oxidation chemical looping process, in accordance with certain embodiments of the invention.
Figure 9:
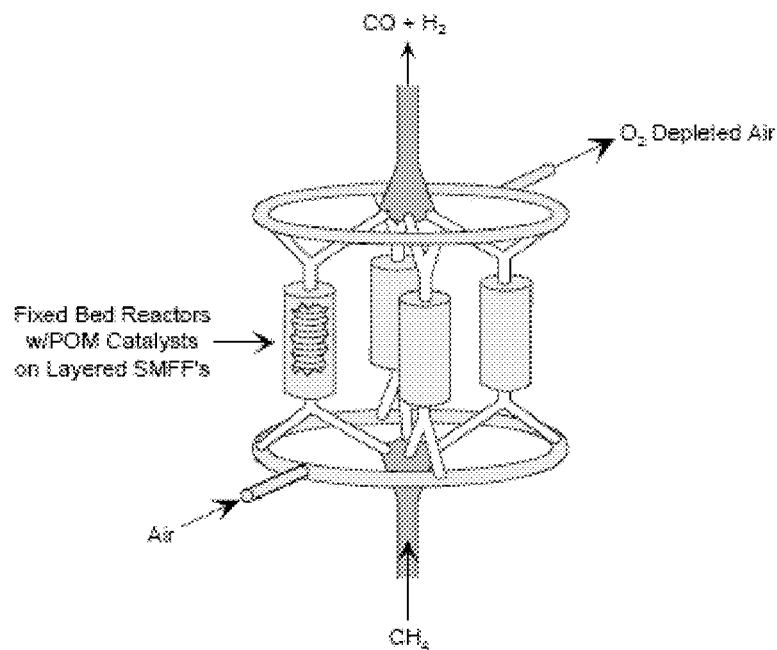
FIG. 9 illustrates a schematic of a fixed bed chemical looping system employing multiple fixed bed reactors in sequence, which is used in accordance with certain embodiments of the invention.

Materials were designed for use in one or more switched feed fixed beds (see FIGS. 8 and 9). Unsupported metal oxide catalysts were prepared by either: (i) co-precipitation, (ii) urea precipitation, and (iii) sol gel synthesis. Initially, a number of the compositional parameters x, y, and z are utilized, but following coarse screening, these stoichiometric subscripts are varied based on the experimental results according to mixture and/or Simplex designs discussed below.

Figure 10:
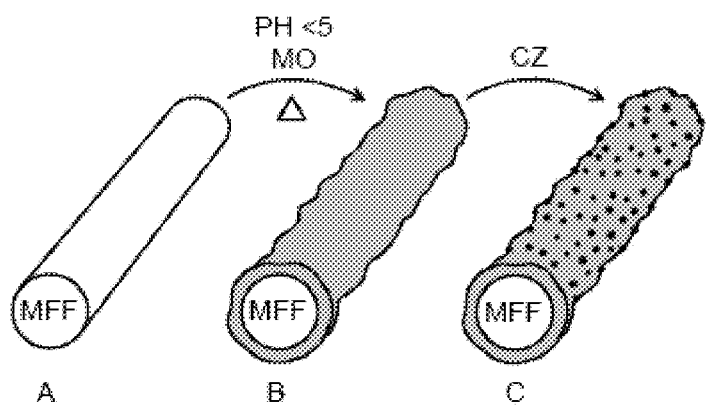
FIG. 10 is a schematic illustration of the preparation procedure for metal oxide coated sintered metal fiber based partial oxidation catalysts for use in accordance with certain embodiments of the invention.

Sintered metal fiber filters (FECRALLOY™ supplied by Bekaert Fiber Technology, Belgium) are coated with $CeO_2$ and/or a variety of cerium based mixed metal oxides. These coated fibers are then impregnated with mixed metal oxide materials having the general formula $Ce_{1-x-y}Ni_y(A)_zO_{2-\delta}$ (where A is a basic metal dopant such as La, Ba, Ca, or Sr). See FIG. 10, (sol-gel synthesis of metal oxide coated sintered metal fibers (A to B) is followed by impregnation of coated surface with mixed metal oxide catalysts (B to C)).

Preparation of the cerium oxide SMFF coatings is achieved through the sol-gel solvent evaporation method. This consists of adding the appropriate metal salts or alkoxides (i.e., acetylacetonates, isopropoxides) to a chosen solvent (various alcohols). A stabilizer, such as acetylacetonate, is added in an attempt to keep the sol solution clear and particle free to prevent large particles from clogging the filter during dip-coating and spraying. The stabilizer addition is followed by addition of a calculated amount of water and acid (HCl, $HNO_3$) or base for hydrolysis and condensation to form precipitate free, homogeneous, non-water sensitive, stable sols. The gels are aged for a chosen time and sprayed onto the sintered metal fiber filter or the filter is immersed in the gel and removed. Regardless of application method the filter is then left to dry for 12-24 hours and then calcined in air at 400° C.-700° C.

Impregnation of the coated SMFFs is done through wet impregnation or incipient wetness impregnation. In wet impregnation the chosen metal salt(s) is(are) combined in previously determined ratios and dissolved in methanol or water. Coated sintered metal fibers are then immersed in the solution for a chosen time frame, extracted, allowed to either age in air and then dried in a 100° C. oven overnight or dried immediately. Dried fiber filters are then calcined in air for 4-8 hours at 700° C.-1000° C. In incipient wetness impregnation chosen metal salt(s) is(are) once again combined, but dissolved in a volume of methanol or water equal or slightly less than the pore volume of the support. This mixture is then carefully applied to the surface of the coated metal fiber by dropwise addition or by fine spray. Impregnated metal fiber filters are either allowed to age for a given time and then dried in a 100° C. oven overnight or dried immediately. Dried fiber filters will then be calcined in air for 4-8 hours at 700° C.-1000° C.

Example 7

Reduction of $CO_2$

A fluidized bed cyclic redox (chemical looping) system utilizing an iron oxide carrier for cyclic reduction of carbon dioxide to carbon monoxide (equations 1,2) and the subsequent reduction of iron oxide to metallic iron (equations 3,4) is described.

$$Fe + CO_2 \rightarrow FeO + CO \quad \Delta H = 10.98 \text{ kJ mol}^{-1} \quad (1)$$

$$3FeO + CO_2 \rightarrow Fe_3O_4 + CO \quad \Delta H = -19.42 \text{ kJ mol}^{-1} \quad (2)$$

$$Fe_3O_4 + H_2 \rightarrow 3FeO + H_2O \quad \Delta H = 60.6 \text{ kJ mol}^{-1} \quad (3)$$

$$FeO + H_2 \rightarrow Fe + H_2O \quad \Delta H = 30.2 \text{ kJ mol}^{-1} \quad (4)$$

Figure 11:
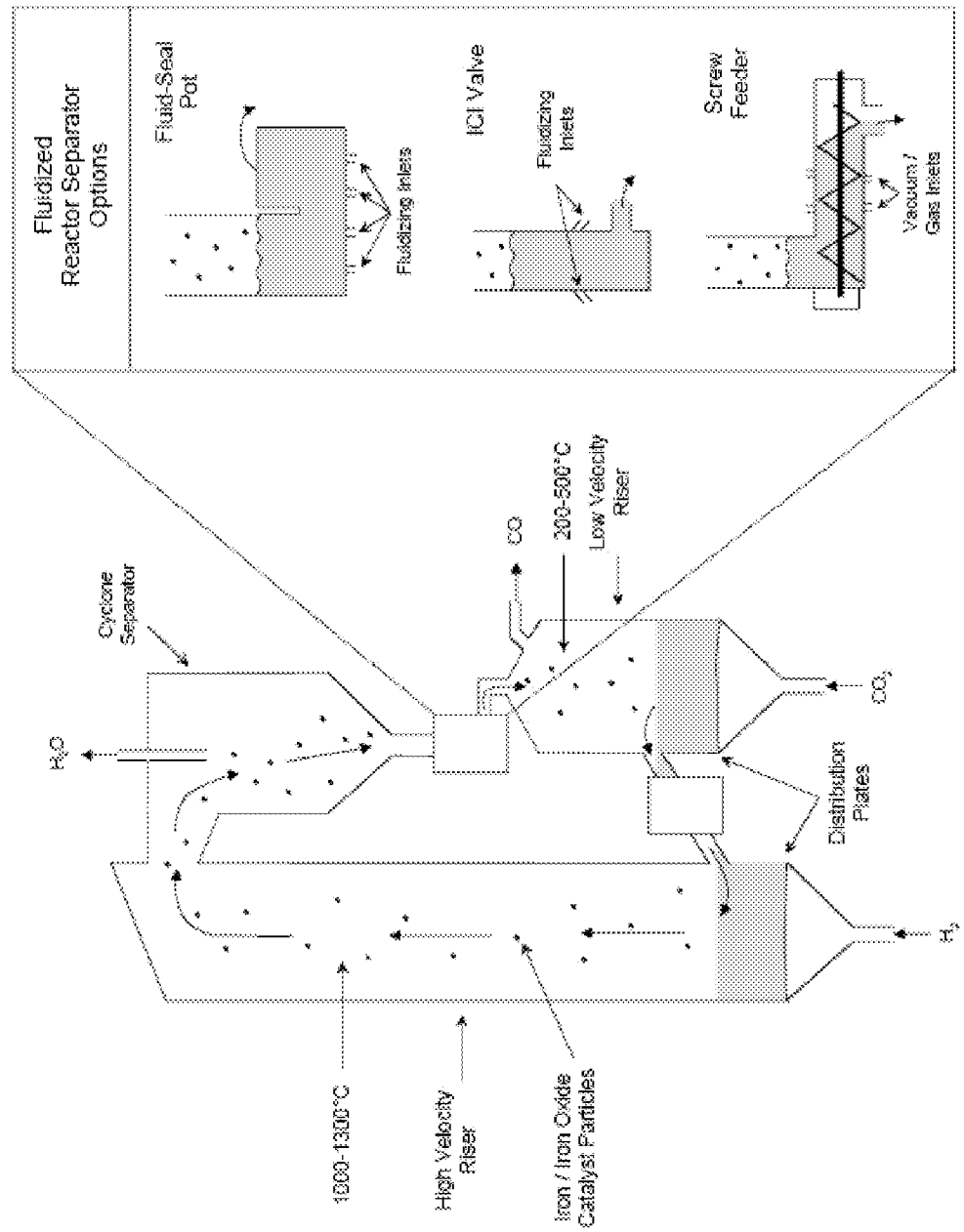
FIG. 11 is a schematic illustration of a fluidized bed based chemical looping process for cyclic reduction of $CO_2$ and subsequent reduction of iron oxide to metallic iron, in accordance with certain embodiments of the invention.

This process embraces in a new way two well-known and proven processes, the reduction of iron oxide with hydrogen and the oxidation of iron with $CO_2$, by linking them together within a chemical looping system. This enables production of CO and $H_2O$, both of which can be used for making fuels, other commodity chemicals, and/or used for life support purposes. While it would be possible to generate both CO and $H_2O$ using a reverse water-gas-shift (RWGS) reactor, embodiments of the present system and process allow easier separation of products, provide a system capable of performing other redox processes, and also provide a low temperature way of recovering metallic iron from iron oxide ores (FIG. 11).

Iron oxides may be synthesized by two different types of precipitation reactions. The first consists of adding a solution of precipitating agent (NaOH, KOH, $Na_2CO_3$, $K_2CO_3$, $NH_4OH$, $(NH_4)_2CO_3$, sodium or potassium oxalate) dropwise into a aqueous or methanol solution of the metal ions, resulting in precipitation of the insoluble metal hydroxides or carbonates. The second type, urea gelation/precipitation, consists of adding a large excess of urea to an aqueous solution of the metal ions. By boiling the resulting solution at 100° C. for eight hours, adding water as necessary, a slow decomposition of the urea ensues, creating a basic solution over time which in turn results in the slow precipitation of the desired products. The precipitate of either method are then collected through vacuum filtration, dried in an oven at 100° C. for 24 hours, ground into a fine powder using an alumina mortar and pestle, and then calcined, in air or in a reducing environment depending on the desired product, at temperatures between 600° C. and 900° C. for 4-12 hours. This process is applicable for reducing $CO_2$ concentrations in gases, and utilizing the water and carbon monoxide products. For example, they may be used in fuels, as feedstocks for making commodity chemicals, and/or used for life support purposes. One particular application is for reducing the $CO_2$ atmosphere on Mars, which is primarily composed of $CO_2$.

Example 8

Supported Oxygen-Carrying Materials for Oxygen Separation and Supply

An exemplary fixed bed cyclic (chemical looping) system utilizing a metal oxide oxygen carrying material supported on sintered metal fiber filters (SMFFs) for the separation of oxygen from air is described in this example and schematically illustrated in FIG. 1B. The separation unit consists of one or more heated beds of SMFF supported metal oxide and would operate by alternate exposure to pressurized air and vacuum while undergoing temperature ramps from 200° C.-400° C. Embodiments of this system would compete directly with more costly cryogenic separation plants as well as pressure swing adsorption systems which currently produce a lower purity of oxygen. Embodiments of this technology produce inexpensive, high purity oxygen streams for use in processes such as coal gasification, integrated gasification combined cycle (IGCC), and oxycombustion leading to an exhaust stream void of $NO_x$ and much more concentrated in $CO_2$, making it easier to capture than with current technologies.

Some suitable materials for application to SMFFs possess the formulas $Sr_wLa_xAl_y(B)_zO_{2-\alpha}$, where $0.01<w<1$, $0.01<x<1$, $0.01<y<1$, $0.01<z<1$, $0<\alpha<1$ and B=Co, Fe, Cu (or a combination of the three). Basecoats applied to SMFFs were shown to be stable and crack free to 700° C.

Figure 12:
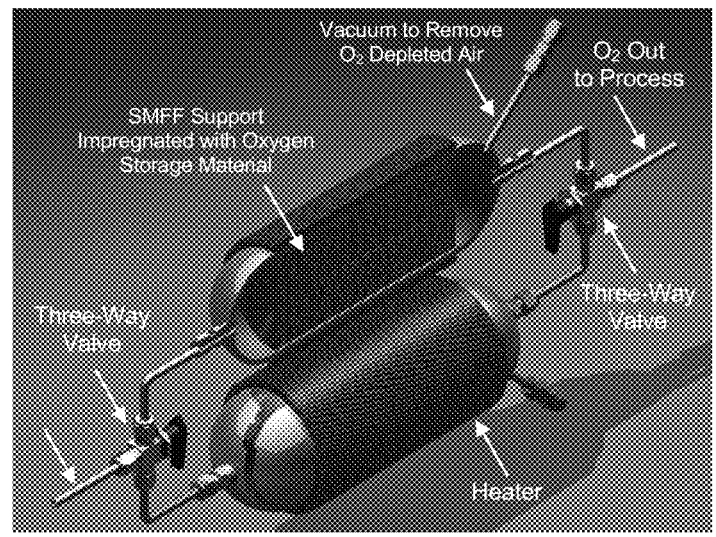
FIG. 12 illustrates a fixed bed cyclic (chemical looping) system utilizing a metal oxide oxygen carrying material supported on sintered metal fiber filters (SMFFs) for the separation of oxygen from air, in accordance with certain embodiments of the invention.

The general oxygen separation process involves the pressurization (between 25 and 75 psi) of the vessel containing the supported metal oxide with air at 200° C. The vessel is heated under pressure to 400° C. and then cooled back to 200° C. The pressure is released and excess nitrogen pulled off via moderate vacuum. High vacuum is then applied and the vessel heated to 400° C. again, whereby the oxygen previously adsorbed will be desorbed and fed into a compressor for use in the given industrial process. One suitable design for an oxygen separation system to carry out this process is illustrated in FIG. 12.

Example 9

Cyclic Catalytic Reformer for Hydrocarbon Fuels

A fixed bed cyclic redox (chemical looping) system utilizing a metal oxide oxygen carrier for partial oxidation of liquid fuel (jet fuel, diesel, kerosene, gasoline, etc) is described and illustrated schematically in FIG. 1A. The reformer consists of a small heated bed of sulfur tolerant partial oxidation catalyst and operates by alternate exposure to air and vaporized fuel. Carbon deposition and steam requirements and, possibly, the need for a prereformer are reduced or eliminated by this cyclic mode. This cyclic operation also eliminates the need for an expensive air separation unit or for $H_2/N_2$ separation.

A compact, lightweight reforming system for obtaining hydrogen for aviation fuel cell applications. The system is based on: 1) the partial oxidation of hydrocarbons by an oxygen carrier which can alternately adsorb oxygen and catalyze partial oxidation of fuel and 2) a post-processing module for hydrogen separation based on a hydrogen transport membrane.

Some suitable oxygen carrier materials include: 1) $Ce_{1-x-y}M_xM'_yO_{2-*}$ (where M=cations of La, Sr, Ba, or other non-reducible metals and MN=cations of Co, Ni, and Cu; and $0.01<x<0.99$, $0.01<y<0.99$, and $1<\delta<2.2$) as well as the same transition metals deposited on a high surface area support such as alumina, magnesium oxide, ceria, magnesium aluminate, aluminosilicates, or mesoporous silica materials.

The addition of molybdenum to cobalt enhances sulfur tolerance, desulfurization activity, and will impart some cracking activity to cobalt. 2) Co, Ni, and Cu and Co—Mo supported on $Al_2O_3$, MgO, $CeO_2$, or $MgAl_2O_4$.

The supported base metal catalysts are prepared by incipient wetness. A typical synthesis includes suspending 10 grams of support ($Al_2O_3$, MgO, $CeO_2$, or $MgAl_2O_4$) in an aqueous solution of the desired metal (Co) nitrate (and ammonium molybdate) without any supernatant liquid. The slurry is dried by evaporation and then heated in an oven at 120° C. for 8 hours. Following drying, the solid is calcined at 600° C. for 12-24 hours in order to decompose the nitrate and provide a supported metal oxide product. If desired, the oxide may then be reduced to elemental metal by flowing $H_2$ over the catalyst at 600° C. for 8 hours.

Example 10

Cyclic Catalytic Reforming of Hydrocarbon Fuels—Co-fed System

Figure 13:
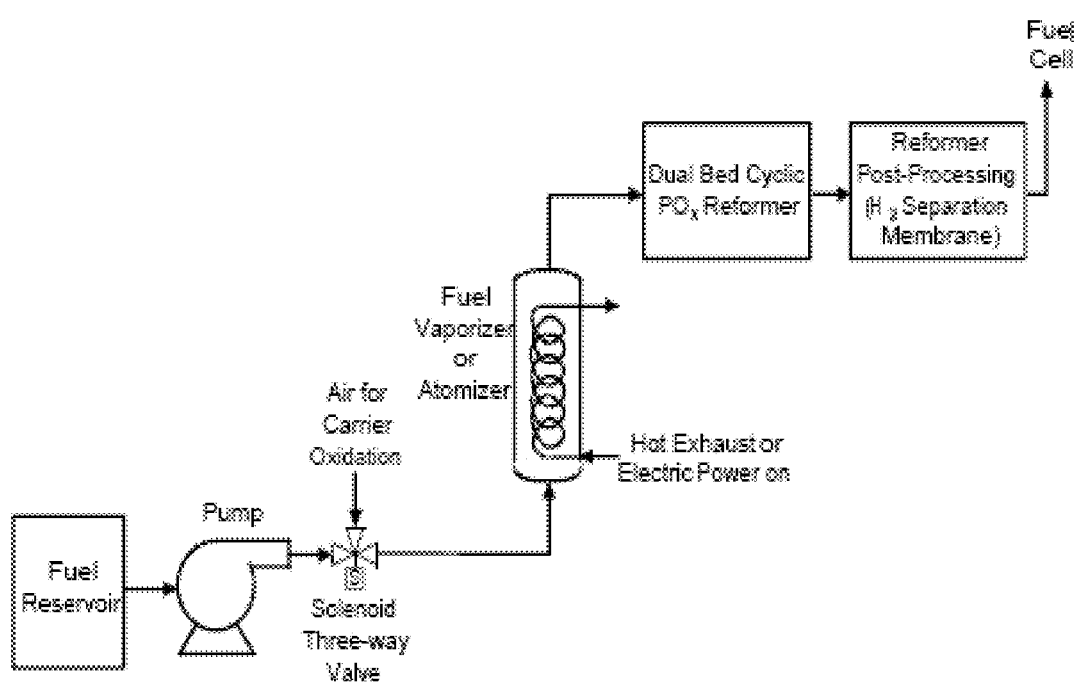
FIG. 13 illustrates a schematic diagram of overall cyclic partial oxidation reformer (CycloFormer™) system, in accordance with certain embodiments of the invention.

A process for the cyclic catalytic reforming of a hydrocarbon fuel utilizes a compact reformer system based on a cyclic (chemical looping) partial oxidation for generating syngas from liquid hydrocarbon logistic fuels (e.g., JP-8, JP-5, Jet-A, diesel, etc.). A reformer incorporating a small heated bed of sulfur tolerant partial oxidation catalyst alternately exposed to air and vaporized fuel is employed. This cyclic mode will potentially reduce the amount of carbon deposited and the amount of steam required. FIG. 13 schematically illustrates the process flow of the reforming operation in a co-fed air/pulsed fuel system using certain oxygen carrying catalysts.

Figure 14:
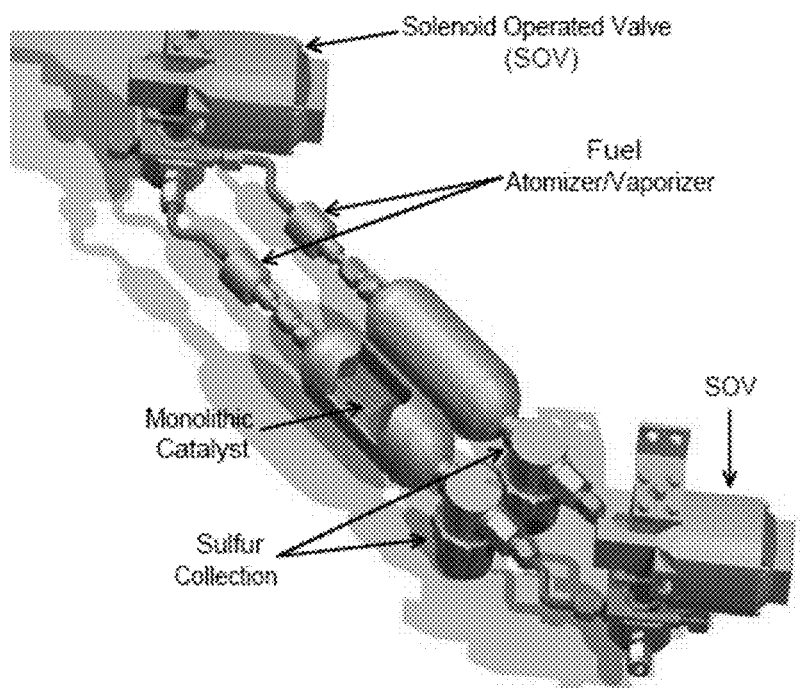
FIG. 14 illustrates a conception of a CycloFormer™ in accordance with an embodiment of the invention

In this process, air is passed continuously over the oxygen carrying (or oxygen storing) catalyst and pulses of fuel are delivered periodically, by co-feeding with the air flow, as shown schematically in FIG. 1C. One system which may be suitably employed for carrying out the pulsed, co-fed reforming process is illustrated in FIG. 14. This technology displays the following characteristics: (1) Process operating conditions are relatively mild: pressure of 1 atmosphere and temperature between 550° C. and 750° C.; (2) $H_2$:CO ratio is continuously variable from <1 to >5 (preferably between 0.9 and 2) by variation of temperature, space velocity, and feed composition (i.e., air/fuel ratio); (3) The process does not use steam. Carbon (coke) formation is dealt with by alternating exposure to fuel rich and fuel lean conditions; (4) Thermal management obtained by splitting reaction into temporally and/or spatially separated carrier and fuel oxidation (carrier reduction) reactions; (5) Multiple beds enable continuous delivery of reformate; and (6) Fuel sulfur can be removed by hydrodesulfurization of organosulfides in the hydrogen rich product stream if the catalyst bed is made sufficiently long.

The catalyst and similarly hot internal surfaces are successively and periodically exposed to fuel and then to air. The resulting deposits can be readily removed by exposure to air. Even on inert inorganic (e.g., ceramic or glass) surfaces, coating internal surfaces with the oxygen carrier (catalyst) can impart carbon oxidation activity, which can, of course, eliminate the problem of carbon deposition over time. The processes responsible for carbon deposition also liberate hydrogen which can be separated down-stream. Even with the occurrence of carbonization, loss of efficiency is not inevitable in the cyclic $PO_x$ process.

Some suitable catalyst (oxygen carriers) are selected from the generic composition $Sr_{2-2x}La_{2x}B_{2-2y}Al_{2y}O_*$, where B=Co and/or Fe, $0.1<x<0.8$, $0.1<y<0.5$, and $4<*<5.8$. In some cases, molybdenum may be added to the catalyst to enhance sulfur tolerance, desulfurization activity, and impart additional cracking activity to cobalt and/or iron.

Example 11

Cyclic Catalytic Reformer for Hydrocarbon Fuels—Sequential Feeds

This variation of a reforming process comprises the partial oxidation of hydrocarbons by an oxygen carrier/catalyst which can alternately adsorb oxygen and catalyze partial oxidation of fuel. The catalyst and similarly hot internal surfaces are successively and periodically exposed to fuel and then to air, in a manner like that illustrated in FIG. 1A. The resulting deposits on the catalyst can be readily removed by exposure to air. Even on inert inorganic (e.g., ceramic or glass) surfaces, coating internal surfaces with the oxygen carrier (catalyst) can impart carbon oxidation activity, which can, potentially eliminate the problem of carbon deposition over time. The processes responsible for carbon deposition also liberate hydrogen which can be separated down-stream. Even with the occurrence of carbonization, loss of efficiency is not inevitable in the cyclic $PO_x$ process.

Some suitable catalysts are selected from the generic composition $Sr_{2-2x}La_{2x}B_{2-2y}Al_{2y}O_\delta$, wherein B=Co and/or Fe, $0.1<x<0.8$, $0.1<y<0.5$, and $4<\delta<5.8$. The addition of molybdenum to the catalyst may enhance sulfur tolerance, desulfurization activity, and impart additional cracking activity to cobalt and/or iron. These materials provide partial oxidation and hydrocarbon cracking activity via metal and acid sites, respectively. Formation of coke at this stage is eliminated by the oxidation activity of catalysts and the cyclic mode of operation. Embodiments of the catalysts also tolerate the presence of sulfur in the fuel because cobalt forms a metal sulfide phase which retains its oxidation activity.

Example 12

Coal Gasification Process

Exemplary metal oxide oxygen carriers/catalysts that are suitable for coal gasification include $Fe_3O_4$, $CO_3O_4$, calcium carbonate, calcium oxide, $FeTiO_3$, $Mn_{1-x}Fe_xO_y$, coal fly ash, and materials possessing the general formula $M_{1-x-y}A_x(B)_yO_z$, wherein M=Co, Fe, or Mn; A is Ce, Zr, or both; and B is a basic metal dopant such as La or Ca. Catalysts are pelletized using binders such as aluminum oxide (and boehmite), titania, colloidal silica, and magnesium oxide. Selected doped ceria materials also displayed good activity. However, they are more expensive than the other materials. An additional, albeit surprising, observation is that the doped ceria materials investigated displayed much lower oxygen storage capacity than $Fe_2O_3$ or $Fe_3O_4$, e.g., 15× lower. These iron oxides provide a very exothermic heat of regeneration, since the oxides are apparently reduced to the metal under operating conditions. Subsequent oxidation of the catalyst, under these circumstances, provides a significant source of thermal energy for utilities or preheating of fluidizing gases.

Silica-bound coal fly ash proved to be the most durable of all bound materials investigated. Thus, in embodiments, fly ash is used as a potential catalyst or catalyst support.

A challenge in chemical looping technology using fluidized bed systems is the fragility of catalyst pellets. Accordingly, in embodiments, the selected oxygen-carrying materials described herein have enhanced attrition resistance. In certain preferred embodiments, by combining oxygen-carrying and support components into one composition, a mechanically strong catalyst possessing activity for conversion of coal to synthesis gas is obtained.

Using a mixture of catalyst ($Fe_3O_4$), cornstarch, and binder (polyvinylbutyral) allows for strong, but still porous catalyst granules to be prepared upon sintering. A 125 mL Nalgene bottle was charged with 40 grams of catalyst powder, 24 grams cornstarch, and 4 grams polyvinyl butyral (PVB). To this mixture was added 10 hardened zirconia grinding media and enough acetone to fill the bottle. The mixture was then placed on a ball mill for 1 hour. After drying in an evaporating dish, with constant stirring, the residue was allowed to dry in a fume hood overnight. The resulting powder was then sieved to less than 45 mesh and pressed in a 2¼ inch die to 20,000 pounds (5,030 psi) for four minutes. The large pellet was sintered at 1025° C. for four hours, 1° C./minute ramp rate. Once tablets were formed as such, they were shattered, ground, and sieved to the desired mesh size (generally 20-40).

Another suitable coal gasification catalyst that serves as an oxygen carrier has the general formula $Ce_{1-x}M_xO_{2-\delta}$ wherein M=Fe, Mn, or Ni and 0.7<x<0.99. For example, $Ce_{0.7}Mn_{0.3}O_2$ and $Ce_{0.7}Ni_{0.3}O_{1.8}$. In embodiments, a ceramic carrier form (e.g., fly ash or iron oxide beads) is impregnated with catalyst. This may be achieved by addition of the pellets to a solution of the desired metal ions or metal complex species in the required concentrations. Excess solvent may be removed by evaporation and the dry beads calcined at 200° C.-1000° C., depending on the catalyst deposited.

Pellets may be fabricated by tumbling powder as catalyst is sprayed onto the pellets or by spray drying. Forms other than spheres may be fabricated. In embodiments, cylindrically symmetric forms (such as bars, tubes, spaghetti, and miniliths) are fabricated using extrusion or (in the case of ring or tubular forms) isostatic pressing. This involves the preparation of a paste or dough of the relevant powder with organic binders, dispersing agents, waxes, and other combustible additives (for porosity enhancement described above). An extruder incorporating a die of the appropriate cross section is used for the extrusion operation. The extruded green bodies are sintered at temperatures of 1000-1700° C., depending on the material being sintered. The extruded form may comprise catalyst or of carrier material: the procedure to be employed may be the same in the two cases. Application of the catalyst to support carriers may be performed as described above for support beads.

A dual fluidized bed configuration (similar to fluidized catalytic cracking) or a switched feed single fluidized bed system may be employed. However, several other embodiments, such as a switched feed moving bed and entrained flow configurations are possible. Selection of the reactor type is typically based on engineering analysis of the potential performance of each type as well as consideration of their advantages and disadvantages. One variation of the switched-feed single bed system is an air fed-vibrating bed system. This allows for the reduction or elimination of a diluent gas feed on gasification. The vibration may be applied during both carrier oxidation and gasification. Frequency, amplitude, and source of vibration are important variables whose influence must be determined by experimentation. The vibrational source may be either vibrating baffles, an air activated piston, or an ultrasonic horn, or any other type of suitable vibration source. This vibrationally fluidized system, as with any fluidized bed design, will require design of fluidized bed internals.

Figure 15:
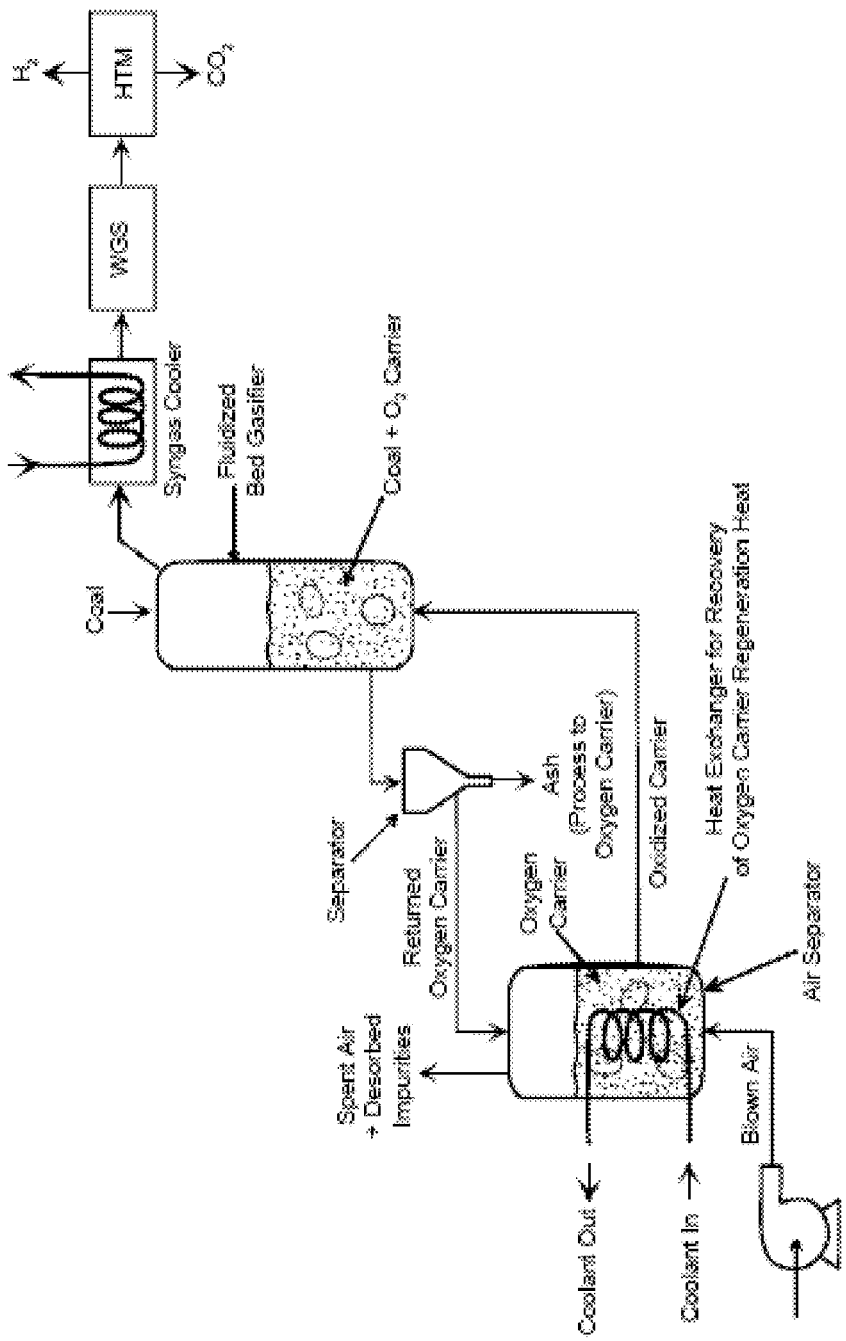
FIG. 15 is a schematic illustration of a process concept which employs an oxygen carrier for oxygen separation and coal gasification, in accordance with certain embodiments of the invention.

The design of fluidized bed internals, including baffles, heat exchanger tubes, separators, and distributor plates, depends on the particular reactor configuration chosen, the particular process requirements, and the predicted influence of component design on fluidized bed behavior. (FIG. 15)

The coal gasification process may be modified, if desired, by feeding other substances, such as biomass, waste, scrap tires, or other opportunity fuels could be fed separately or concurrently with coal for gasification. Because a low operating temperature ($\leq 900°$ C.) is employed, the gasifier preferably operates in an ashing, rather than slagging mode. In still other variations of the coal gasification process, inorganic waste streams (e.g., ash) are processed for use as the oxygen carrier.

Additional variations of the coal gasification process include 1) conversion of biomass to synthesis gas; 2) chemical looping partial oxidation of hydrocarbons; 3) chemical looping combustion of solid fuels including coal, biomass, heavy reside, etc.; 4) chemical looping combustion of hydrocarbons; and 5) chemical looping hydrogen production.

Example 13

Catalysts and Process for Selective Hydrocarbon Dehydrogenation/Oxidative Coupling Hydrocarbon dehydrogenation/oxidative coupling chemistry proceeds at the surface of metal oxide catalysts possessing the general formula $AB_{1-x}B'_xO_y$ (A=Sr or Ba; B=Ce or Zr; and B'=Y or Yb; and 0<x<0.5)/$MO_x$ (where M=Ce, Mn, or Ni) or x % $MO_x$/y % $A_2WO_4$/MgO (or $SiO_2$), where A=Na or K, 1<x<3, and 3<y<8; and M=Ce, Mn, or Ni. Catalysts for promoting the selective and spontaneous oxidative dehydrogenation or coupling of hydrocarbons, is based on the application of super-base, amphoteric (i.e., containing both acid or electrophilic, and base sites) catalysts. Catalysis is based on a mixture of both oxygen storage and oxidative dehydrogenation catalyst components in contact with one another.

The synergistic role of the catalyst components and their functions is only fully exploited when optimum process operating conditions are also employed. Among the potential advantages of embodiments of this technology are (1) Molecular oxygen is not present as with a co-feed configuration. This reduces the occurrence of destructive side reactions and enhances selectivity towards desired non-$CO_x$ products; (2) Chemical looping oxidative dehydrogenation is exothermic, in contrast to thermal dehydrogenation, which is endothermic. Hence, considerable energy savings may result; (3) Cryogenic oxygen separation from the atmosphere is eliminated since oxygen for promoting the subject reaction is separated directly from air via the chemical looping system; (4) Natural gas is a plentiful and inexpensive chemical feedstock for ethylene synthesis thereby contributing to low ethylene feedstock costs. In addition, the presence of ethane and other light hydrocarbons in natural gas participate in enhanced ethylene production.

The catalysis strategy for promoting the oxidative dehydrogenation reaction relies on either basic or amphoteric sites for activating C—H bonds. Additionally, an oxygen storage function must be present to allow for chemical looping. Of the proposed oxidative dehydrogenation components, the first category, the super-bases of general formula $AB_{1-x}B'_xO_y$, are represented most effectively by $BaZr_{1-x}Y_xO_{2.5-\delta}$ and are the currently preferred catalyst materials. In the case of the amphoteric catalysts, the transition metal oxide serves as an oxygen storage component. These species are expected to exhibit a somewhat unique mechanism of reactivity relative to strongly basic species. In the case of the MTM and MTS systems, the likely C—H activation site is a surface W=O which is expected to be more acidic than basic due to the high electrophilicity of the W(VI) ion. Manganese oxide, as indicated above, is included in some embodiments in order to provide oxygen storage capacity.

Use of these materials in chemical looping ODH is implemented by: 1) preparing catalysts possessing the composition $AB_{1-x}B'_xO_y/MO_x$ (A=Sr or Ba; B=Ce or Zr; B'=Y or Yb; 0<x<0.5; M=Ce, Mn, or Ni); and x % $MO_x$/y % $A_2WO_4$/MgO (or $SiO_2$), where A=Na or K, 1<x<3, 3<y<8; and M=Ce, Mn, or Ni; 2) preparing granules of material of the above discussed compositions for promoting the overall subject reaction; 3) incorporating the most active catalysts into a fixed bed reactor and determining their performance towards efficiently and selectively promoting alkane oxidative dehydrogenation in representative gas mixtures; and 4) optimizing catalyst materials and process conditions.

Figure 16:
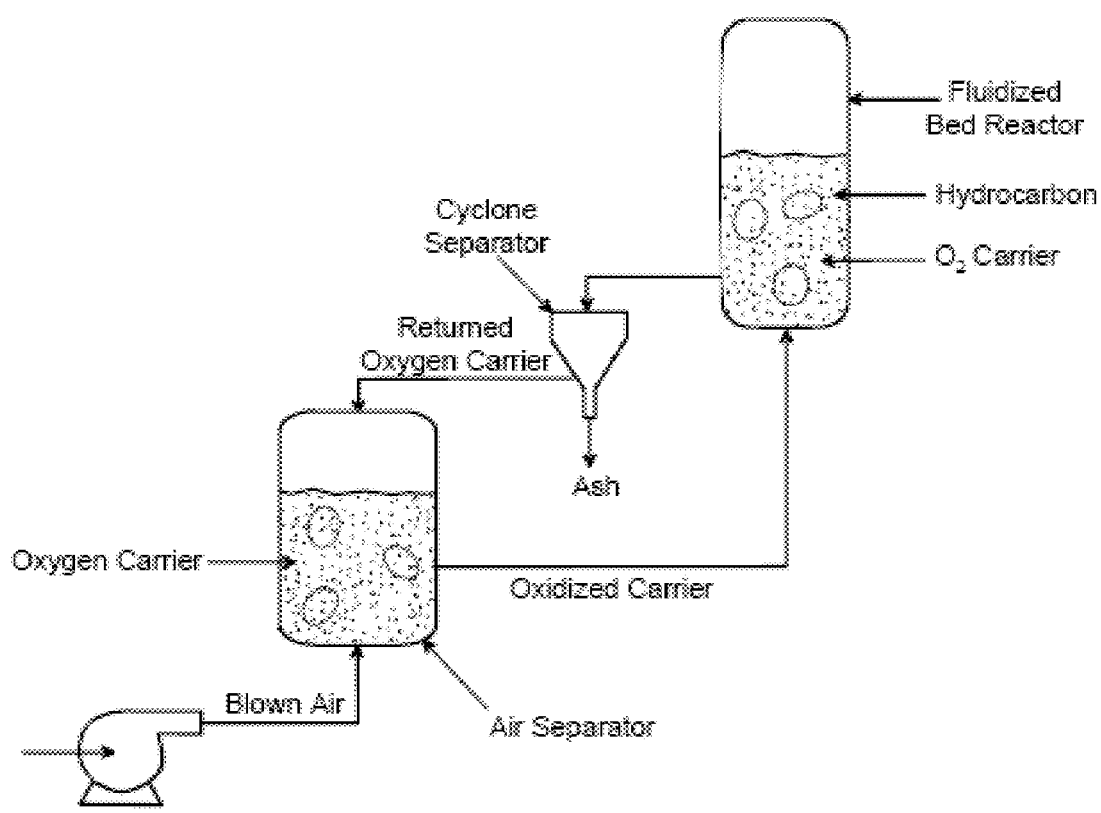
FIG. 16 is a schematic illustration of an oxidative dehydrogenation process employing an oxygen carrying catalyst for oxygen separation and fluidization, in accordance with certain embodiments of the invention.

The materials are employed in a cyclic (chemical looping) process based on a circulating fluidized bed process and system (FIG. 16) or a switched (between air and fuel) feed fluidized bed system or switched feed fixed bed system, in which air and fuel feeds are alternated.

Example 14

Catalysts and Process for Direct Generation of Hydrogen Peroxide

Nanostructured catalyst materials prepared by "nanocasting" carbon/nitrogen-containing metal complexes in the pores of mesoporous silicas or by self-assembling such complexes with inorganic (e.g., silica) precursors and their application in a process for the direct generation of hydrogen peroxide is discussed in this example. In embodiments, new catalysts are based on the thermal decomposition of specific metal complexes (Pt, Pd, Au, Ag, Co, Ni, Cu, or Ru phthalocyanine or tetraphenylporphine) in the pores of mesoporous silica materials or by the spontaneous self-assembly of metal complex and inorganic framework precursors. The anticipated net effect of these metallomacrocycle-based nanostructured catalysts will be 1) to provide highly (even atomically) dispersed active catalyst sites, 2) to provide high surface area and pore volume, and 3) to provide specific benefits of other properties of the nanostructured materials. These multifunctional catalyst materials are used in a chemical looping process for catalyzing the direct reaction of hydrogen and oxygen to form hydrogen peroxide. The cyclic process design allows: (1) Separation of oxygen from air, (2) use of undiluted hydrogen with minimal explosion hazard because hydrogen and oxygen are spatially separated when each contacts the catalyst and/or 3) elimination of organic solvent use.

In the chemical looping process in which oxygen or hydrogen is incorporated into a component of the catalyst in one zone of the process, followed by transport of the "charged" catalyst to the opposite zone, where it reacts with oxygen or hydrogen to form $H_2O_2$ and the product and catalyst are separated by motion of the catalyst in the reactor. Chemical looping can be better understood by consideration of the reaction scheme for this process:

$$M+O_2 \rightarrow Ox \qquad (1)$$

$$Ox+H_2 \rightarrow Re \qquad (2)$$

$$Re+O_2 \rightarrow H_2O_2 \qquad (3)$$

$$\text{Overall: } H_2+O_2 \rightarrow H_2O_2 \qquad (4)$$

where Ox and Re refer to the oxidized and reduced forms of the catalyst, respectively. In a sense, this is quite similar to a variety of chemical processes, including the anthraquinone, Wacker, and other processes in which a redox intermediate is employed. Embodiments of this process offer various potential advantages, including: 1) the ability to separate $O_2$ from air, 2) the ability to use higher concentrations and pressures of hydrogen and oxygen, 3) enhanced safety obtained by separation of hydrogen and oxygen, and 4) the benefits of a fluidized bed.

Example 15

Catalytic Cyclic Process for Waste Gasification

A cyclic process in which an oxygen carrier is alternately oxidized in air and reduced by contact with waste species (waste feed, char, volatiles, etc.), resulting in gasification of the waste and subsequent carrier regeneration potentially exhibits excellent heat transfer characteristics, relatively low operating temperature, and minimal tar accumulation. The process makes use of the redox properties of selected metal oxide materials and their separate interactions with air and waste material. This process for waste gasification involves the combination of two technologies: chemical looping separation of oxygen from air and fluidized bed gasification catalyzed by the oxygen carriers.

Embodiments of this technology will offer the following potential attributes: 1) feed flexibility brought about by pre-pyrolysis of waste into char and volatiles; 2) lower cost for air separation; 3) a gasifier that is optimal for conversion of waste feed with minimal heat loss and slag or ash processing without accumulation of tar in cooler downstream parts of the system; 4) the excellent heat transfer characteristics of fluidized bed gasifiers; 5) reduced tar accumulation owing to presence of oxidized oxygen carrier in vulnerable regions of the gasifier; and 6) improved syngas cleanup.

The technology makes use of fluidized beds for several purposes: (1) "Charging" of oxygen carriers (i.e., saturation with oxygen); (2) Reaction with solid waste, char, and volatiles with reduced tar accumulation; (3) Clean-up of synthesis gas using sorptive additives. Ultimately, in the overall concept, waste gasification may be conducted using a chemical looping reactor to effect combined air separation, waste gasification, and gross sulfur removal.

A system comprised of: (1) a preprocessing stage in which waste is compacted and dried. The preprocessing stage consists of a retort for drying and waste heating, along with a condenser for collection of tar and oils. (2) An ASU/gasification reactor based on Eltron's chemical looping technology. In embodiments, the preprocessed waste stream is devolatilized (using waste heat from the gasifier and syngas quench cooling) by pyrolysis upon its entrance into the gasifier chamber. Thus, it is possible that pyrolysis and gasification can be combined in the chemical looping gasifier reactor. 3) A syngas quench cooler. 4) A warm gas cleanup module. This may consist of a third fluidized bed or of a downstream sorption module. Warm gas clean-up would be performed either by the use of sorbents in a third fluidized bed or of downstream adsorbent beds containing materials selected from zinc oxide, zinc oxide supported copper (low temperature water gas shift catalyst), or the regenerable sorbents zinc ferrite or zinc titanate. 5) A hydrogen separation module.

The metal oxide catalysts are selected from $Fe_3O_4$, $Co_3O_4$, $Mn_{1-x}Fe_xO_y$, and materials possessing the general formula $M_{1-x-y}A_x(B)_yO_z$, (where M=Co, Fe, or Mn; A is Ce, Zr, or a combination of the two; and B is a basic metal dopant such as La or Ca). Other compositions may be investigated as deemed necessary. The catalysts may be pelletized using one of the following binders: yttrium stabilized zirconium (YSZ), aluminum oxide, boehmite, gibbsite, and magnesium oxide.

Example 16

Partial Oxidation of Crude Glycerol to Produce Synthesis Gas

Figure 17:
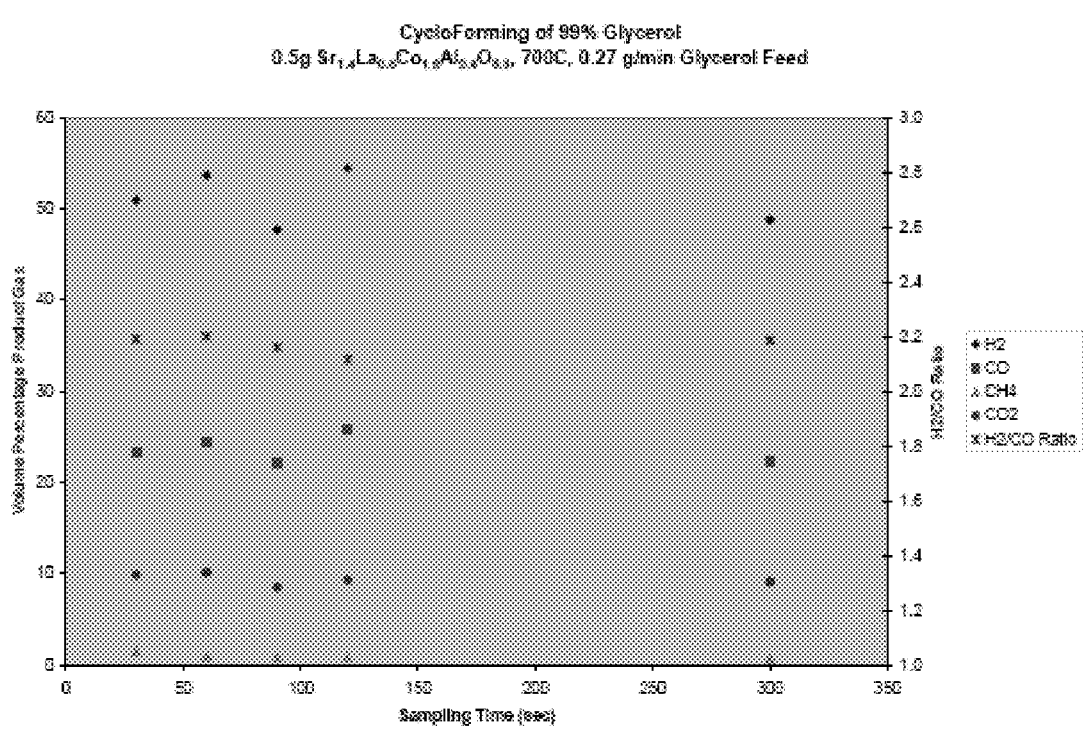
FIG. 17 is a plot of product evolution versus time between the appearance of products and sampling time for 99% Glycerol over a $Sr_{1.4}La_{0.6}Co_{1.6}Al_{0.4}O_{5.3}$ catalyst at 700° C., in accordance with certain embodiments of the invention.

A new process of partially oxidizing glycerol (FIG. 17), called CycloForming™ potentially produces high levels of syngas and an excellent distribution of $H_2$ and CO for Fischer-Tropsch Synthesis at low temperatures in contrast to other processes such as pyrolysis which produce mainly liquid. In a representative study, 0.5 g of $Sr_{1.4}La_{0.6}Co_{1.6}Al_{0.4}O_{5.3}$ granules were packed into a fixed bed reactor and heated to 700° C. Catalyst oxidation comprises one leg of the chemical looping cycle. This was performed in situ by feeding air over the catalyst bed for 1-30 minutes prior to introducing glycerol. The catalyst bed was then purged with helium and the atomized glycerol was introduced at a flow rate of 0.27 g/min. A sample of the product gas was taken and analyzed using a gas chromatograph at a set time from when the gaseous products began to be produced. Several cycles alternating between air and glycerol were performed with variable glycerol exposure times.

Figure 18:
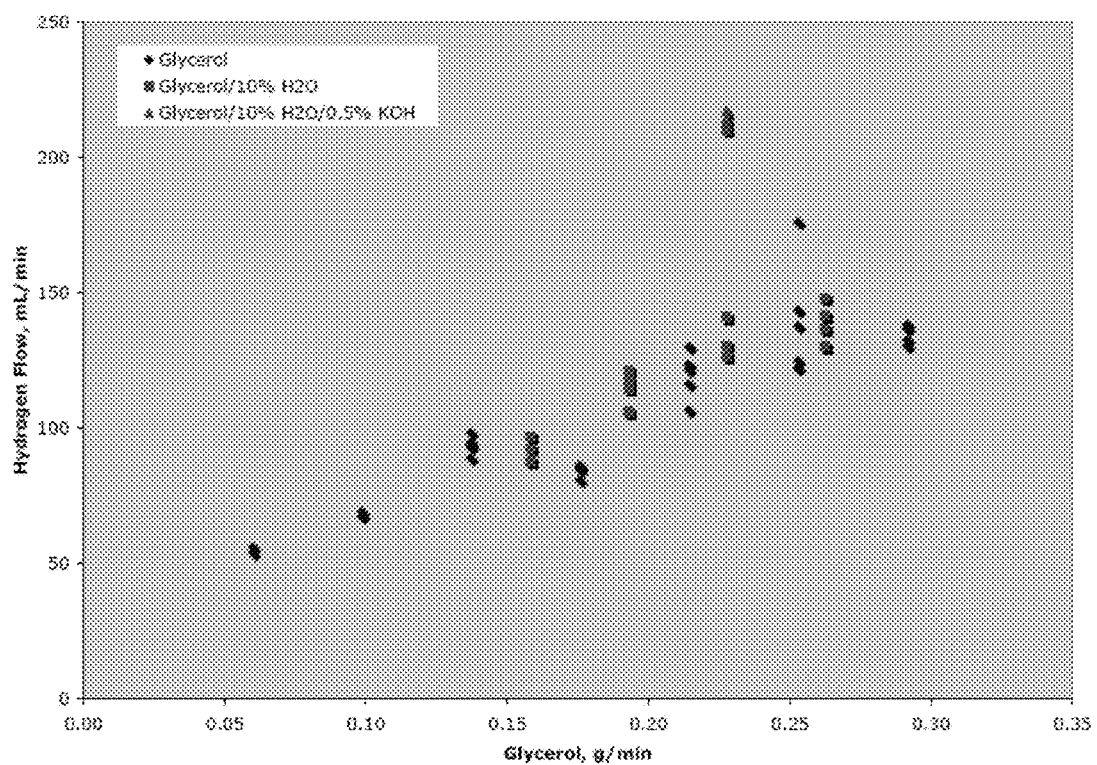
FIG. 18 is a plot of the effect of water and KOH addition (to simulate crude glycerol) on hydrogen production at 800° C. by an oxygen-carrying catalyst, in accordance with certain embodiments of the invention.
Figure 19:
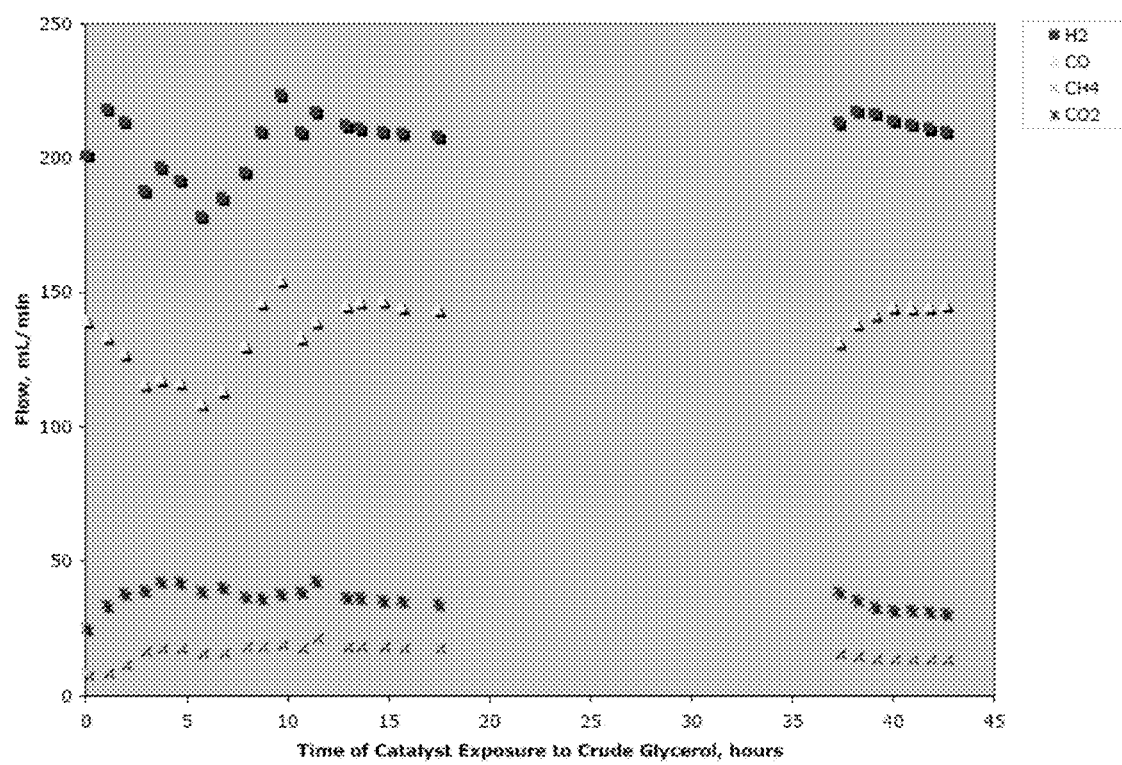
FIG. 19 is a plot demonstrating the stability of the $Sr_{1.4}La_{0.6}Co_{1.6}Al_{0.4}O_{5.3}$ coated YSZ granules for reforming glycerol/water/KOH mixture (simulated crude glycerol) in a process according to an embodiment of the invention.

Representative catalysts have shown excellent resistance to catalyst fouling from the residual KOH in crude glycerol (residual transesterification catalyst). Besides increasing the efficiency of the reforming reaction, the KOH imparts reverse water-gas-shift capacity to the catalyst, which converts the $H_2O$ stream to $H_2$ (see FIG. 18). For this experiment porous catalyst granules of yttria-stabilized zirconia (YSZ) were prepared and coated with 6.6 wt % $Sr_{1.4}La_{0.6}CO_{1.6}Al_{0.4}O_{5.3}$. 20 g of coated granules were packed into a fixed bed reactor and heated to 800° C. Catalyst oxidation comprises one leg of the chemical looping cycle. This was performed in situ by feeding air over the catalyst bed for 1-30 minutes prior to introducing glycerol. The catalyst bed was then purged with helium and the atomized glycerol, glycerol with water, or glycerol with water and KOH (simulated crude glycerol) was introduced with the flow rate varied from cycle to cycle. For this experiment, the glycerol cycle length was long (more than 1 hour) to allow for equilibration of the reaction at each flow setting. Samples of the product gas were taken and analyzed using a gas chromatograph. Several cycles were performed over a 23 day period. For the last 6 days, KOH stability was tested. The simulated crude glycerol was introduced into the reactor at 0.23 g/min for about 8 hours per day and the catalyst was reoxidized with air overnight. FIG. 19 shows that even with KOH in the crude glycerol, the catalyst is stable for more than 40 hours of exposure. Similar catalysts having the general formula $Sr_vLa_wB_xB'_yB''_zO_\delta$, wherein B=Co or Fe; B'=Al or Ga; B''=Cu; $0.01<v<1.4$; $0.1<w<1.6$; $0.1<x<1.9$; $0.1<y<0.9$; $0<z<2.2$; and $3<\delta<5.5$ are expected to have similar resistance to catalyst fouling from crude glycerol, and will be similarly active for catalyzing the partial oxidation of glycerol to produce synthesis gas.

Without further elaboration, it is believed that one skilled in the art can, using the description herein, utilize the present invention to its fullest extent. The foregoing embodiments are to be construed as illustrative, and not as constraining the remainder of the disclosure in any way whatsoever. While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. In the following discussion and in the claims, the terms "including" and "comprising" are used in an open-ended fashion, and thus should be interpreted to mean "including, but not limited to.". Each original claim is incorporated into the specification as an embodiment of the invention. Thus the original claims are a further description and are an addition to the preferred embodiments. The disclosures of all patents, patent applications and publications cited herein are hereby incorporated herein by reference, to the extent that they provide exemplary, procedural or other details supplementary to those set forth herein.

REFERENCES

The following references are cited in the foregoing text, or may be helpful as additional background information.
1. Mattisson, T.; Lyngfelt, A. "Application of chemical-looping combustion with capture of $CO_2$", *Second Nordic Minisymposium on Carbon Dioxide Capture and Storage*, Göteborg, Oct. 26, 2001.
2. Ishida, M.; Jin, H.; Okamoto, T. *Energy & Fuels* 1998, 12, 223-229.
3. Ishida, M.; Jin, H.; Okamoto, T. *Energy & Fuels* 1996, 10, 958-963.
4. Christensen, T. S.; Primdahl, I. I. *Hydrocarbon Processing*, March 1994, pg. 39.
5. Aasberg-Petersen, K.; Bak Hansen, J. H.; Christensen, I. D.; Seier Christensen, P.; Stub Nielson, C.; Winter Madsen, S. E. L.; Rostrup-Nielsen, J. R. *Appl. Cat. A: General* 2001, 221, 379-387.
6. Ayabe, S.; Omoto, H.; Utaka, T.; Kikuchi, R.; Sasaki, K.; Teraoka, Y.; Eguchi, K. *Appl. Cat. A: General* 2003, 241, 1-2, 261.
7. Takeguchi, T.; Furukawa, S.-N.; Inoue, M.; Eguchi, K. *Appl. Cat. A: General* 2003, 240, 1-2, 223.
8. Ishida, M.; Jin, H. *Ind. Eng. Chem. Res.* 1996, 35, 2469-2472.
9. Lyngfelt, A.; Leckner, B.; Mattison, T. *Chem. Eng. Sci.* 2001, 56, 3101-3113.

10. "Combustion Laboratory Update", Western Kentucky University Institute for Combustion Science and Environmental Technology, December 2004. Internet Address: http://www.wku.edu/ICSET/comblab.htm (last visited Sep. 20, 2007).

11. Lyngfelt, A.; Kronberger, B.; Adanez, J.; Morin, J.-X.; Hurst, P. "Development of Oxygen Carrier Particles for Chemical-Looping Combustion. Design and Operation of a 10 kW Chemical-Looping Combustor" *The Grace Project,* 2004. Internet Address: http://uregina.ca/ghgt7/PDF/papers/peer/132.pdf (last visited 20/09/2007).

12. Ishida, M.; Yamamoto, M.; Ohba, T. *Energy Cony. and Manag.* 2002, 43, 1469-1478.

13. Jin, H.; Okamoto, T.; Ishida, M. *Ind. Eng. Chem. Res.* 1999, 38, 126-132.

14. de Diego, L. F.; Garcia-Labiano, F.; Adanez, J.; Gayan, P.; Abad, A.; Corbella, B. M.; Maria Palacios, J. *Fuel* 2004, 83, 1749-1757.

15. Adanez, J.; de Diego, L. F.; Garcia-Labiano, F.; Gayan, P.; Abad, A. *Energy & Fuels* 2004, 18, 371-377.

16. Cho, P.; Mattisson, T.; Lyngfelt, A. *Fuel* 2004, 83, 1215-1225.

17. Ryden, M.; Lyngfelt, A. "Hydrogen and Power Production with Integrated Carbon Dioxide Capture by Chemical-Looping Reformer", $7^{th}$ *International Conference on Greenhouse Gas Control Technologies,* Vancouver, September 5-$9^{th}$, 2004.

18. S. Tamhankar, D. Acharya, Y. Zeng, R. Ramprasad, and R. Ramachandran, Presented at the Pittsburgh Coal Conference, Program Topic, Utilization-Direct, 2.2 Advanced Gas Separation, Sep. 23-27, 2002.

19. Y. Zeng, S. S. Tamhankar, K. W. Limbach, and K. V. Sekharipuram, U.S. Pat. No. 6,143,203.

20. Y. Zeng, R. Jain, S. S. Tamhankar, D. L. MacLean, and N. Ramprasad, U.S. Pat. No. 6,379,586 B1.

21. Y. Zeng, D. L. MacLean, S. S. Tamhankar, N. Ramprasad, F. R. Fitch, and K. W. Limbach, U.S. Pat. No. 6,464,955 B2.

22. D. Kunii and T. Kunugi, U.S. Pat. No. 3,989,481.

23. R. K. Lyon, U.S. Pat. No. 6,797,253 B2.

24. R. K. Lyon, U.S. Pat. No. 5,827,496.

25. H. G. Jin and M. Ishida, *Fuel,* 83, 2411 (2004).

26. K. Mondal, K. Piotrowski, D. Dasgupta, E. Hippo, and T. Wiltowski, *Ind. Eng. Chem. Res.,* 44, 5508 (2005).

27. G. Rizeq, A. Frydman, R. Sabia, J. West, V. Zamansky, and K. Das, presented at the $29^{th}$ International Technical Conference on Coal Utilization and Fuel Systems (Clearwater Conference), Apr. 18-22, 2004.

28. J. L. Marion, N. ya Nsakala, and R. MacWhinnie, Final Report to DOE, PPL Report No. PPL-03-CT-09.

We claim:

1. A process comprising:
   alternately contacting an oxygen-carrying catalyst with a reducing substance, or a lower partial pressure of an oxidizing gas, and then with said oxidizing gas or a higher partial pressure of said oxidizing gas, whereby the catalyst is alternately reduced and then regenerated to an oxygenated state,
   wherein said oxygen-carrying catalyst comprises compounds having the formula $Ce_xB_yB'_zB''_wO_\delta$, wherein B=Ba, Sr, Ca, or Zr; B'=Mn, Co, and/or Fe; B''=Cu; $0.01 \leq x \leq 0.99$; $0 \leq y \leq 0.6$; $0 \leq z \leq 0.5$; and $1 < \delta < 2.2$;
   wherein said reducing substance, when contacted with said oxygen-carrying catalyst, is converted to at least one chemical product.

2. The process of claim 1, wherein said reducing substance is selected from the group consisting of gas, liquid, and solid substances.

3. The process of claim 1, wherein said contacting comprises:
   alternately exposing a fixed bed containing said catalyst to said reducing substance and to said oxidizing gas, or
   exposing said fixed bed containing said catalyst to a continuous feed of said oxidizing gas and intermittently feeding said reducing substance.

4. The process of claim 1, wherein said contacting comprises:
   circulating said catalyst in a fluidized bed system during said alternate contacting of said oxygen-carrying catalyst with a reducing substance, or a lower partial pressure of an oxidizing gas, and then with said oxidizing gas or a higher partial pressure of said oxidizing gas.

5. The process of claim 1, wherein said contacting comprises:
   circulating said catalyst in a fluidized bed system wherein said catalyst is reduced in a reactor and is circulated to a regeneration unit for contacting with said oxidizing gas or higher partial pressure of said oxidizing gas.

6. The process of claim 1, wherein said reducing substance comprises a gaseous hydrocarbon, said chemical product is synthesis gas, and said catalyst is active for catalyzing the partial oxidation of said hydrocarbon, wherein said catalyst comprises:
   $Ce_xB_yB'_zB''_wO_\delta$, wherein B=Ba, Sr, Ca, or Zr; B'=Mn, Co, and/or Fe; B''=Cu; $0.01<x<0.99$, $0<y<0.6$, $0<w<0.5$, and $1<\delta<2.2$.

7. The process of claim 1, wherein said reducing substance comprises liquid hydrocarbon fuel and lower partial pressure oxidizing gas in combination, said product comprises synthesis gas, said catalyst is active for catalyzing the partial oxidation of said liquid hydrocarbon fuel, and said process comprises:
   co-feeding both said fuel and a lower partial pressure of an oxidizing gas to said catalyst in a reforming reactor, to reduce said catalyst, and produce synthesis gas, and
   exposing said reduced catalyst to said higher partial pressure of said oxidizing gas in the absence of said fuel to regenerate said catalyst.

8. The process of claim 7, further comprising separating $H_2$ from said synthesis gas.

9. The process of claim 7, wherein said contacting comprises contacting said catalyst at a temperature less than or equal to 900° C.

10. The process of claim 1, wherein said reducing substance comprises a liquid fuel selected from the group consisting of diesel, gasoline, jet fuel, alcohols, glycerol, and plant oils.

11. The process of claim 1, wherein said reducing substance comprises a hydrocarbon, said product comprises a dehydrogenated hydrocarbon, and said catalyst is active for oxidatively dehydrogenating said hydrocarbon, wherein said catalyst comprises:
   $Ce_xB_yB'_zB''_wO_\delta$, wherein B=Ba, Sr, Ca, or Zr; B'=Mn, Co, and/or Fe; B''=Cu; $0.01 \leq x \leq 0.99$, $0<y<0.6$, $0<z>0.5$, $0<w<0.5$, and $1<\delta<2.2$.

12. The process of claim 1, wherein said reducing substance comprises a hydrocarbon, said product comprises an oxidatively functionalized hydrocarbon, and said catalyst is active for catalyzing the selective oxidation of said hydrocarbon by which at least one oxygenous function is inserted into said hydrocarbon, wherein said catalyst comprises:
   $Ce_xB_yB'_zB''_wO_\delta$, wherein B=Ba, Sr, Ca, or Zr; B'=Mn, Co, and/or Fe; B''=Cu; and $0.01<x<0.99$, $0<y<0.6$, $0<w<0.5$, and $1<\delta<2.2$).

13. The process of claim 1, wherein said catalyst is supported on a sintered metal fiber filter.

14. A process for the cyclic catalytic partial oxidation of a carbon-containing feedstock, comprising:
- (a) in an oxidation stage, passing air over a catalyst comprising a metal or metal oxide that is capable of capturing oxygen from said air, to produce an oxidized catalyst and producing an effluent comprising oxygen-reduced air;
- (b) in a reduction stage, passing said feedstock over said oxidized catalyst to create a product gas comprising carbon monoxide and hydrogen, wherein said oxidized catalyst becomes reduced or partially reduced creating a metal or metal oxide; and
- (c) repeating (a) to reoxidize the catalyst, wherein said catalyst comprises at least one metal oxide selected from the group consisting of:

$Ce_xB_yB'_zB''O_\delta$, wherein B=Ba, Sr, Ca, or Zr; B'=Mn, Co, and/or Fe; B''=Cu; $0.01<x<0.99$; $0<y<0.6$; $0<z<0.5$; $1<\delta<2.2$.

15. The process of claim 14, wherein said feedstock comprises glycerol.

* * * * *